US010142557B2

(12) United States Patent
Ajito

(10) Patent No.: US 10,142,557 B2
(45) Date of Patent: Nov. 27, 2018

(54) IMAGE PICKUP APPARATUS, IMAGE PICKUP METHOD, AND NON-TRANSITORY COMPUTER-READABLE MEDIUM STORING COMPUTER PROGRAM

(71) Applicant: OLYMPUS CORPORATION, Hachioji-shi, Tokyo (JP)

(72) Inventor: Takeyuki Ajito, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/488,023

(22) Filed: Apr. 14, 2017

(65) Prior Publication Data
US 2017/0223250 A1 Aug. 3, 2017

Related U.S. Application Data

(63) Continuation of application No. PCT/JP2015/059178, filed on Mar. 25, 2015.

(30) Foreign Application Priority Data

Nov. 4, 2014 (JP) ................. 2014-224418

(51) Int. Cl.
H04N 5/235 (2006.01)
H04N 5/349 (2011.01)
H04N 5/232 (2006.01)

(52) U.S. Cl.
CPC ....... H04N 5/2356 (2013.01); H04N 5/23212 (2013.01); H04N 5/23232 (2013.01); H04N 5/349 (2013.01)

(58) Field of Classification Search
CPC .. H04N 5/2356; H04N 5/23232; H04N 5/349; H04N 5/23212; G06T 2207/10148
See application file for complete search history.

(56) References Cited

U.S. PATENT DOCUMENTS

2009/0160941 A1* 6/2009 Sun .................. G06T 3/4069
348/162
2013/0308035 A1 11/2013 Hiasa

FOREIGN PATENT DOCUMENTS

DE 19922261 A1 12/1999
JP 06-225317 8/1994
(Continued)

OTHER PUBLICATIONS

International Search Report to PCT/JP2015/059178, dated Jun. 23, 2015 (1 pg.), with translation (1 pg.).
(Continued)

Primary Examiner — Ahmed A Berhan
(74) Attorney, Agent, or Firm — John C. Pokotylo; Pokotylo Patent Services

(57) ABSTRACT

An image pickup apparatus includes a processor configured of hardware functioning as a pixel-shift-combination processing section configured to perform pixel shift combination of a plurality of image data acquired by performing pixel shift photographing in a certain focus position to generate combined image data, a depth-combination processing section configured to perform depth combination of a plurality of combined image data in different focus positions that the depth-combination processing section causes the pixel-shift-combination processing section to generate, and a microcomputer configured to extract a focused region in at least one or more of the plurality of focus positions. The pixel-shift-combination processing section performs, concerning a focus position where the focused region is extracted, the pixel shift combination concerning only a partial image region including the focused region.

9 Claims, 20 Drawing Sheets

(56) References Cited

FOREIGN PATENT DOCUMENTS

| JP | 10-136253 | 6/2010 |
| JP | 4678603 B | 2/2011 |
| JP | 2013-243522 | 12/2013 |

OTHER PUBLICATIONS

Extended European Search Report to counterpart EP Application No. 15858039.9, dated May 30, 2018 (7 pgs.).

* cited by examiner

| $R^1(x, y)$ | | $R^3(x, y)$ | |
|---|---|---|---|
| | $R^2(x, y)$ | | $R^4(x, y)$ |
| $R^8(x, y)$ | | $R^6(x, y)$ | |
| | $R^7(x, y)$ | | $R^5(x, y)$ |

FIG. 5

| $Gr^3(x-1, y)$ | | $Gr^1(x, y)$ | |
| --- | --- | --- | --- |
| | $Gr^4(x-1, y)$ | | $Gr^2(x, y)$ |
| $Gr^6(x-1, y)$ | | $Gr^8(x, y)$ | |
| | $Gr^5(x-1, y)$ | | $Gr^7(x, y)$ |

FIG. 6

| $Gb^8(x, y-1)$ | | $Gb^6(x, y-1)$ | |
| --- | --- | --- | --- |
| | $Gb^7(x, y-1)$ | | $Gb^5(x, y-1)$ |
| $Gb^1(x, y)$ | | $Gb^3(x, y)$ | |
| | $Gb^2(x, y)$ | | $Gb^4(x, y)$ |

FIG. 7

| $B^6(x-1, y-1)$ | | $B^8(x, y-1)$ | |
|---|---|---|---|
| | $B^5(x-1, y-1)$ | | $B^7(x, y-1)$ |
| $B^3(x-1, y)$ | | $B^1(x, y)$ | |
| | $B^4(x-1, y)$ | | $B^2(x, y)$ |

IMAGE PICKUP APPARATUS, IMAGE PICKUP METHOD, AND NON-TRANSITORY COMPUTER-READABLE MEDIUM STORING COMPUTER PROGRAM

CROSS REFERENCE TO RELATED APPLICATION

This application is a continuation application of PCT/JP2015/059178 filed on Mar. 25, 2015 and claims benefit of Japanese Application No. 2014-224418 filed in Japan on Nov. 4, 2014, the entire contents of which are incorporated herein by this reference.

BACKGROUND OF INVENTION

1. Field of the Invention

The present invention relates to an image pickup apparatus, an image pickup method, and a non-transitory computer-readable medium storing a computer program for performing a pixel shift and depth combination to generate high-resolution combined image data having a large depth of field.

2. Description of the Related Art

There has been proposed a technique for combining a plurality of image data, which are acquired by performing a pixel shift with a movement amount that is a non-integer multiple of a pixel pitch, and generating high-resolution combined image data.

For example, Japanese Patent Application Laid-Open Publication No. H6-225317 describes a technique for shifting an image sensor of a Bayer array in a horizontal direction, a vertical direction, or an oblique direction by 0.5 pixel or one pixel at a time to perform photographing four or eight times and combining obtained four or eight images to thereby generate an image having double resolution in the horizontal direction and the vertical direction.

There has also been proposed a technique for performing focus bracket photographing for acquiring a plurality of images while changing a focus position and performing depth combination of the obtained plurality of images to thereby obtain an image having a large depth of field with an enlarged focus range.

For example, Japanese Patent No. 4678603 describes a technique for acquiring a plurality of images through focus bracket photographing, deforming the images such that feature points of the respective images coincide with one another, and selecting and combining pixels having the highest sharpnesses among pixels corresponding to one another among the plurality of images to output an omni-focal image focused on an entire screen.

SUMMARY OF THE INVENTION

An image pickup apparatus according to a certain aspect of the present invention includes a processor configured of hardware, the processor being configured to function as: a pixel-shift processing section configured to perform pixel shift photographing in a certain focus position to acquire a plurality of image data and perform pixel-shift combination processing of the acquired plurality of image data to generate pixel-shift combined image data; a depth processing section configured to cause the pixel-shift processing section to perform processing on a plurality of focus positions, cause the pixel-shift processing section to generate a plurality of pixel-shift combined image data in different focus positions, and perform depth combination processing of the plurality of pixel-shift combined image data to generate an image having large depth of field; and a focused-region extracting section configured to extract a focused region in at least one of the plurality of focus positions, wherein the pixel-shift processing section performs, concerning a focus position where the focused region is extracted, the pixel-shift combination processing concerning only a partial image region including the focused region.

An image pickup method according to a certain aspect of the present invention includes: performing pixel shift photographing in a certain focus position to acquire a plurality of image data and performing pixel-shift combination processing of the acquired plurality of image data to generate pixel-shift combined image data; executing, on a plurality of focus positions, processing for generating the pixel-shift combined image data to generate a plurality of pixel-shift combined image data in different focus positions and performing depth combination processing of the plurality of pixel-shift combined image data to generate an image having large depth of field; and extracting a focused region in at least one of the plurality of focus positions, wherein, in the processing for generating the pixel-shift combined image data, concerning a focus position where the focused region is extracted, the pixel-shift combination processing is performed concerning only a partial image region including the focused region.

In a non-transitory computer-readable medium storing a computer program according to a certain aspect of the present invention, the computer program causes a computer to execute: performing pixel shift photographing in a certain focus position to acquire a plurality of image data and performing pixel-shift combination processing of the acquired plurality of image data to generate pixel-shift combined image data; executing, on a plurality of focus positions, processing for generating the pixel-shift combined image data to generate a plurality of pixel-shift combined image data in different focus positions and performing depth combination processing of the plurality of pixel-shift combined image data to generate an image having large depth of field; and extracting a focused region in at least one of the plurality of focus positions, wherein, in the processing for generating the pixel-shift combined image data, concerning a focus position where the focused region is extracted, the pixel-shift combination processing is performed concerning only a partial image region including the focused region.

BRIEF DESCRIPTION OF THE DRAWINGS

FIG. 5 is a diagram showing Gr pixel arrangement obtained by the pixel arranging section from the eight Bayer images of the pixel arrangement shown in FIG. 3 in the first embodiment;

FIG. 6 is a diagram showing Gb pixel arrangement obtained by the pixel arranging section from the eight Bayer images of the pixel arrangement shown in FIG. 3 in the first embodiment;

FIG. 7 is a diagram showing B pixel arrangement obtained by the pixel arranging section from the eight Bayer images of the pixel arrangement shown in FIG. 3 in the first embodiment;

DETAILED DESCRIPTION OF THE PREFERRED EMBODIMENT(S)

Embodiments of the present invention are explained below with reference to the drawings.

First Embodiment

Figure 1:
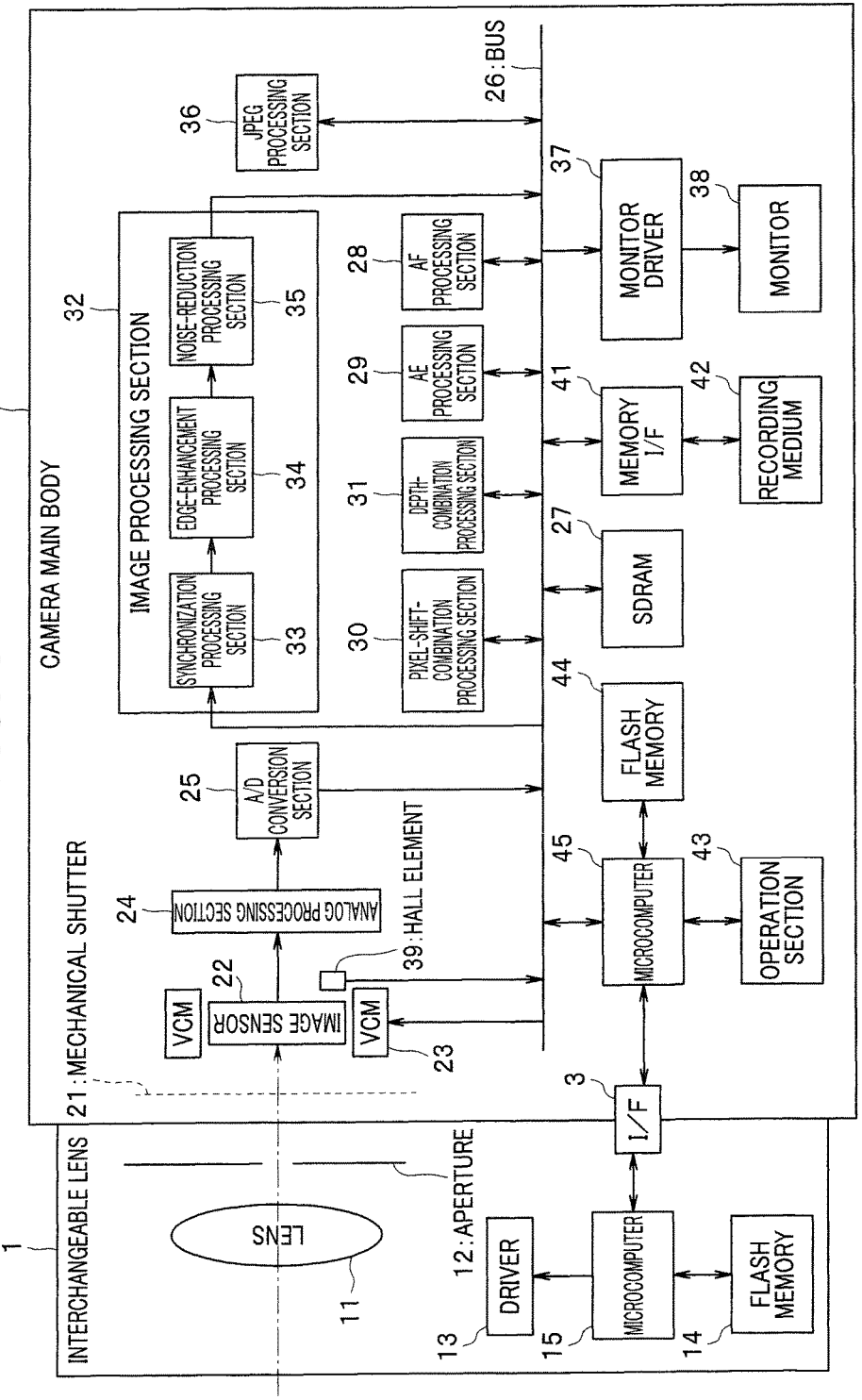
FIG. 1 is a block diagram showing a configuration of a digital camera in a first embodiment of the present invention.

FIG. 1 to FIG. 19 show a first embodiment of the present invention. FIG. 1 is a block diagram showing a configuration of a digital camera. In the present embodiment, an image pickup apparatus is applied to the digital camera.

The digital camera is configured by connecting an interchangeable lens 1 and a camera main body 2 to be capable of communicating via an interface (I/F) 3.

The interchangeable lens 1 is detachably mounted on the camera main body 2 via, for example, a lens mount. The interface 3 is configured by electric contacts formed in the lens mount (an electric contact provided on the interchangeable lens 1 side and an electric contact provided on the camera main body 2 side) and the like. In this way, the interchangeable lens 1 can communicate with the camera main body 2 via the interface 3.

The interchangeable lens 1 includes a lens 11, an aperture 12, a driver 13, a flash memory 14, and a microcomputer 15.

The lens 11 is an image pickup optical system for forming an optical image of an object on an image sensor 22 to be explained below of the camera main body 2.

The aperture 12 is an optical aperture configured to control a passing range of a light beam that passes through the lens 11.

The driver 13 drives the lens 11 and performs adjustment of a focus position and, when the lens 11 is an electric zoom lens or the like, also performs a change of a focal length on the basis of a command from the microcomputer 15. In addition, the driver 13 drives the aperture 12 to change an aperture diameter on the basis of a command from the microcomputer 15. Brightness of the optical image of the object changes and magnitude of a blur and the like also change according to the driving of the aperture 12.

Note that, when the digital camera acquires a plurality of image data while performing a focus bracket and a pixel shift in a high depth super resolution photographing mode explained below, a focus position of the lens 11 is sequentially changed according to the focus bracket. In the present embodiment, the aperture 12 is driven when an aperture diameter is varied to be large and small to acquire two images in order to extract a focused region in respective focus positions in focus bracket photographing.

The flash memory 14 is a storage medium configured to store processing programs executed by the microcomputer 15 and various kinds of information concerning the interchangeable lens 1.

The microcomputer 15 is a so-called lens-side computer and is connected to the driver 13, the flash memory 14, and the interface 3. The microcomputer 15 communicates with a microcomputer 45, which is a main body-side computer to be explained below, via the interface 3, receives a command from the microcomputer 45, performs readout/writing of the information stored in the flash memory 14, and controls the driver 13. Further, the microcomputer 15 transmits the various kinds of information concerning the interchangeable lens 1 to the microcomputer 45.

The interface 3 connects the microcomputer 15 of the interchangeable lens 1 and the microcomputer 45 of the camera main body 2 to be capable of bidirectionally communicating with each other.

The camera main body 2 includes a mechanical shutter 21, an image sensor 22, a voice coil motor (VCM) 23, an analog processing section 24, an analog/digital conversion section (A/D conversion section) 25, a bus 26, an SDRAM 27, an AF processing section 28, an AE processing section 29, a pixel-shift-combination processing section 30, a depth-combination processing section 31, an image processing section 32, a JPEG processing section 36, a monitor driver 37, a monitor 38, a Hall element 39, a memory interface (memory I/F) 41, a recording medium 42, an operation section 43, a flash memory 44, and a microcomputer 45.

The mechanical shutter 21 controls a time period in which a light beam from the lens 11 reaches the image sensor 22. The mechanical shutter 21 is, for example, a mechanical shutter having a configuration for causing a shutter curtain to travel. The mechanical shutter 21 is driven by a command of the microcomputer 45 and controls the reaching time of the light beam to the image sensor 22. When an exposure start and an exposure end are specified by only the mechanical shutter 21, the reaching time of the light beam is an exposure time of the object by the image sensor 22. Note that, when the digital camera acquires a plurality of image data while performing the focus bracket and the pixel shift in the high depth super resolution photographing mode to be explained below, the mechanical shutter 21 is maintained in an open state from a point in time before a first image is acquired until a point in time after a last image is acquired.

Figure 13:
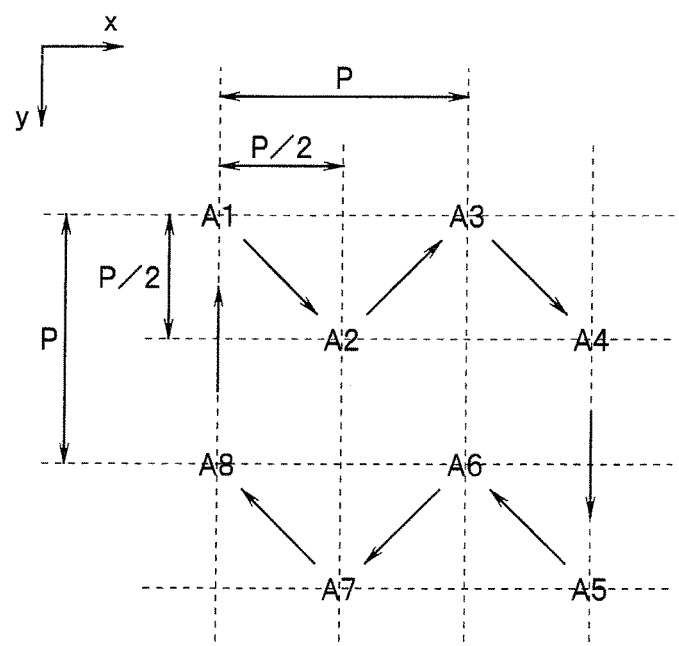
FIG. 13 is a diagram showing a route of a pixel shift performed by a pixel shifting section in the first embodiment.

The image sensor 22 includes a plurality of pixels two-dimensionally arrayed at a predetermined pixel pitch (see a pixel pitch P shown in FIG. 13 and the like). The image sensor 22 photoelectrically converts an optical image of the object formed via the lens 11 and the aperture 12 to generate an analog image signal on the basis of control by the microcomputer 45, which is a pixel-shift-image-pickup control section (an image-pickup control section and a part of a pixel-shift processing section) and a focus-bracket-image-pickup control section (an image-pickup control section and a part of a depth processing section). The image sensor 22 not only can perform all-pixel readout but also can read out a pixel signal of a desired line or a desired region (or a desired pixel).

The image sensor 22 of the present embodiment is configured as, for example, a single plate-type image sensor in which color filters of a primary color Bayer array are disposed on front surfaces of a plurality of pixels arrayed in a vertical direction and a horizontal direction. Note that, naturally, the image sensor 22 is not limited to the single plate-type image sensor and may be, for example, a stacked-type image sensor that separates color components in a plate thickness direction.

The voice coil motor (VCM) 23 is a part of the pixel-shift processing section and displaces relative positions of the image sensor 22 and a light beam, which is received by the image sensor 22, in a two-dimensional pixel array direction, and is a pixel shifting section and a displacing section configured to move the relative positions to set a movement amount of a frame period to a non-integer multiple of a pixel pitch (e.g., in units of a half pixel pitch) (FIG. 13, etc.). A specific configuration of the voice coil motor (VCM) 23 is to, for example, float the image sensor 22 in the air with a magnetic force and control the magnetic force to thereby move a position of the image sensor 22 in a plane perpendicular to an optical axis of the lens 11.

Note that the voice coil motor (VCM) 23 is explained as an example of the pixel shifting section. However, the pixel shifting section is not limited to this. Other appropriate mechanism that can perform the pixel shift may be used.

After reducing reset noise and the like, the analog processing section 24 performs waveform shaping on the analog image signal read out from the image sensor 22 and further performs gain-up to obtain target brightness.

The A/D conversion section 25 converts the analog image signal outputted from the analog processing section 24 into a digital image signal (hereinafter referred to as image data).

The bus 26 is a transfer path for transferring various data and control signals generated in a certain place in the digital camera to another place in the digital camera. The bus 26 in the present embodiment is connected to the voice coil motor (VCM) 23, the A/D conversion section 25, the SDRAM 27, the AF processing section 28, the AE processing section 29, the pixel-shift-combination processing section 30, the depth-combination processing section 31, the image processing section 32, the JPEG processing section 36, the monitor driver 37, the Hall element 39, the memory I/F 41, and the microcomputer 45.

The image data outputted from the A/D conversion section 25 (in the following explanation, referred to as RAW image data as appropriate) is transferred via the bus 26 and once stored in the SDRAM 27.

The SDRAM 27 is a storing section configured to temporarily store the RAW image data or various data such as image data processed in the pixel-shift-combination processing section 30, the depth-combination processing section 31, the image processing section 32, and the JPEG processing section 36.

The AF processing section 28 extracts a signal of a high-frequency component from the RAW image data and acquires a focus evaluation value through AF (autofocus) integration processing. The acquired focus evaluation value is used for AF driving of the lens 11. Note that, naturally, AF is not limited to such contrast AF. For example, phase difference AF may be performed using an exclusive AF sensor (or a pixel for AF on the image sensor 22).

The AE processing section 29 calculates object luminance on the basis of the RAW image data. The calculated object luminance is used for automatic exposure (AE) control, that is, control of the aperture 12 and control of the mechanical shutter 21, exposure timing control of the image sensor 22 (or control of a so-called element shutter), and the like. Note that the RAW image data is used as data for calculating the object luminance. However, instead of the RAW image data, data obtained by providing an exclusive photometric sensor in the digital camera may be used.

The pixel-shift-combination processing section 30 is a part of the pixel-shift processing section. According to the control by the microcomputer 45, which is the pixel-shift-image-pickup control section, the pixel-shift-combination processing section 30 performs pixel-shift combination processing of a plurality of image data acquired by driving the voice coil motor (VCM) 23 in a certain focus position to move the image sensor 22 and performing photographing and generates pixel-shift combined image data (also called super resolution image) having higher resolution than image data obtained from the image sensor 22. The pixel-shift-combination processing section 30 is configured to perform, for each set (i.e., for each focus position), the pixel-shift combination processing of a plurality of sets in different focus positions of a plurality of pixel-shifted image data acquired by the control by the microcomputer 45, which is the focus-bracket-image-pickup control section, and generate a plurality of high-resolution pixel-shift combined image data in different focus positions.

The depth-combination processing section 31 is a part of the depth processing section and performs depth combination processing of the plurality of pixel-shift combined image data in the different focus positions generated by the pixel-shift-combination processing section 30 and generates an image having a large depth of field. More specifically, the depth-combination processing section 31 calculates sharpnesses of pixels of the plurality of pixel-shift combined image data in the different focus positions generated by the pixel-shift-combination processing section 30 and performs the depth combination processing for setting pixel values of pixels having the highest sharpnesses in pixel positions as pixel values of the pixel positions to compose an image having a larger depth of field than image data obtained from the image sensor.

The image processing section 32 performs various kinds of image processing on the RAW image data or the image data generated by the pixel-shift-combination processing section 30 and the depth-combination processing section 31. The image processing section 32 includes a synchronization processing section 33, an edge-enhancement processing section 34, and a noise-reduction processing section 35.

The synchronization processing section 33 performs synchronization processing for converting image data of a Bayer array, in which only one color component among RGB components is present for one pixel, into image data, in which all pixels include all of three color components of RGB, by interpolating and calculating color components absent in a pixel of attention from peripheral pixels.

The edge-enhancement processing section 34 performs edge enhancement processing on the image data.

The noise-reduction processing section 35 performs noise reduction processing by performing, for example, coring processing corresponding to a space frequency on the image data.

The image data after the various kinds of processing are performed by the image processing section 32 in this way is stored in the SDRAM 27 again.

When recording the image data, the JPEG processing section 36 reads out the image data from the SDRAM 27, compresses the read-out image data according to a JPEG compression scheme, and causes the SDRAM 27 to once store the compressed image data. The compressed image data stored in the SDRAM 27 in this way is added with a header necessary for configuring a file and arranged as data for recording by the microcomputer 45. The arranged data for recording is recorded in the recording medium 42 via the memory I/F 41 on the basis of the control by the microcomputer 45.

The JPEG processing section 36 also performs expansion of the read-out image data. That is, when reproduction of a recorded image is performed, for example, a JPEG file is read out from the recording medium 42 via the memory I/F 41 and once stored in the SDRAM 27 on the basis of the control by the microcomputer 45. The JPEG processing section 36 reads out the JPEG image data stored in the SDRAM 27, expands the read-out JPEG image data according to a JPEG expansion scheme, and causes the SDRAM 27 to store the expanded image data.

The monitor driver 37 reads out the image data stored in the SDRAM 27, converts the read-out image data into a video signal, performs driving control of the monitor 38, and causes the monitor 38 to display an image based on the video signal. The image display performed by the monitor driver 37 includes rec view display for displaying image data immediately after photographing for a short time, reproduction display of a JPEG file recorded in the recording medium 42, and live view display.

The monitor 38 displays an image and displays various kinds of information related to the digital camera according to the driving control of the monitor driver 37 explained above.

The Hall element 39 is a position detecting section configured to detect, in time series, the relative position explained above during the photographing operation of the image sensor 22 moved by the voice coil motor (VCM) 23. The Hall element 39 is used as the position detecting section. However, naturally, the position detecting section is not limited to the Hall element 39.

As explained above, the memory I/F 41 performs the writing of the image data in the recording medium 42 and the readout of the image data from the recording medium 42.

The recording medium 42 stores the image data in a nonvolatile manner. The recording medium 42 is configured by a memory card or the like detachably attachable to the camera main body 2. However, the recording medium 42 is not limited to the memory card and may be a disk-like recording medium or may be any other recording media. Therefore, the recording medium 42 does not need to be a component peculiar to the digital camera.

The operation section 43 is a section for performing various operation inputs to the digital camera. The operation section 43 includes operation buttons and the like such as a power button for turning on/off a power supply of the digital camera, a release button including two-stage operation buttons including, for example, a 1st (first) release switch and a 2nd (second) release switch for instructing a start of photographing of an image, a reproduction button for performing reproduction of a recorded image, a menu button for performing setting and the like of the digital camera, a cross key used for selection operation for items, and an OK button used for decision operation for selected items.

Items that can be set using the menu button, the cross key, the OK button, and the like include photographing modes (a normal photographing mode, a high depth super resolution photographing mode, etc.) and recording modes (a JPEG recording mode, a RAW+JPEG recording mode, etc.). When operation is performed on the operation section 43, a signal corresponding to operation content is outputted to the microcomputer 45.

The flash memory 44 is a storage medium configured to store, in a nonvolatile manner, processing programs executed by the microcomputer 45 and various kinds of information related to the digital camera. Several examples of the information stored by the flash memory 44 include various parameters necessary for operation of the digital camera such as parameters used for the edge enhancement processing and parameters used for the noise reduction processing, information such as magnitude, a direction, and order of the pixel shift in the high depth super resolution photographing mode, and a manufacture number for specifying the digital camera. The information stored by the flash memory 44 is read by the microcomputer 45.

The microcomputer 45 controls the respective sections in the camera main body 2 and transmits a command to the microcomputer 15 via the interface 3 to control the interchangeable lens 1. The microcomputer 45 is a control section that collectively controls the digital camera. When an operation input is performed from the operation section 43 by the user, the microcomputer 45 reads parameters necessary for processing from the flash memory 44 and executes various sequences corresponding to operation content according to the processing program stored in the flash memory 44.

The microcomputer 45 is a part of the pixel-shift processing section and also functions as a pixel-shift-image-pickup control section configured to control, while controlling the voice coil motor (VCM) 23 to perform the pixel shift for moving the relative positions, the image sensor 22 to perform exposures a plurality of times during the movement of the relative positions and acquire a plurality of image data.

Further, the microcomputer 45 is a part of the depth processing section and also functions as a focus-bracket-image-pickup control section configured to repeatedly perform the image pickup control by the pixel-shift-image-pickup control section while discretely moving a focus position with a predetermined movement amount and acquire a plurality of sets of a plurality of image data in different focus positions.

In addition, the microcomputer 45 also functions as a focused-region extracting section configured to extract a focused region in an image in at least one of a plurality of focus positions subjected to image-pickup control by the focus-bracket-image-pickup control section.

When a focused region is extracted by the focused-region extracting section, the pixel-shift-combination processing section 30 uses and combines only image data of a partial image region including the focused region and generates pixel-shift combined image data.

That is, in the image pickup apparatus of the present invention, as explained below, the pixel-shift processing section performs the pixel shift photographing in a certain focus position and acquires a plurality of image data and performs the pixel-shift combination processing of the acquired plurality of image data to generate pixel-shift combined image data, the depth processing section causes the pixel-shift processing section to perform processing on a plurality of focus positions and generate a plurality of pixel-shift combined image data in different focus positions and performs the depth combination processing of the plurality of pixel-shift combined image data to generate an image having a large depth of field, the focused-region extracting section extracts a focused region in at least one of the plurality of focus positions, and the pixel-shift processing section performs, concerning the focus position where the focused region is extracted, the pixel-shift combination processing concerning only a partial image region including the focused region.

The microcomputer 45 of the present embodiment also functions as an image-pickup control section configured to control the aperture 12 and the image sensor 22 to photograph two images at different aperture diameters of the aperture 12.

Figure 2:
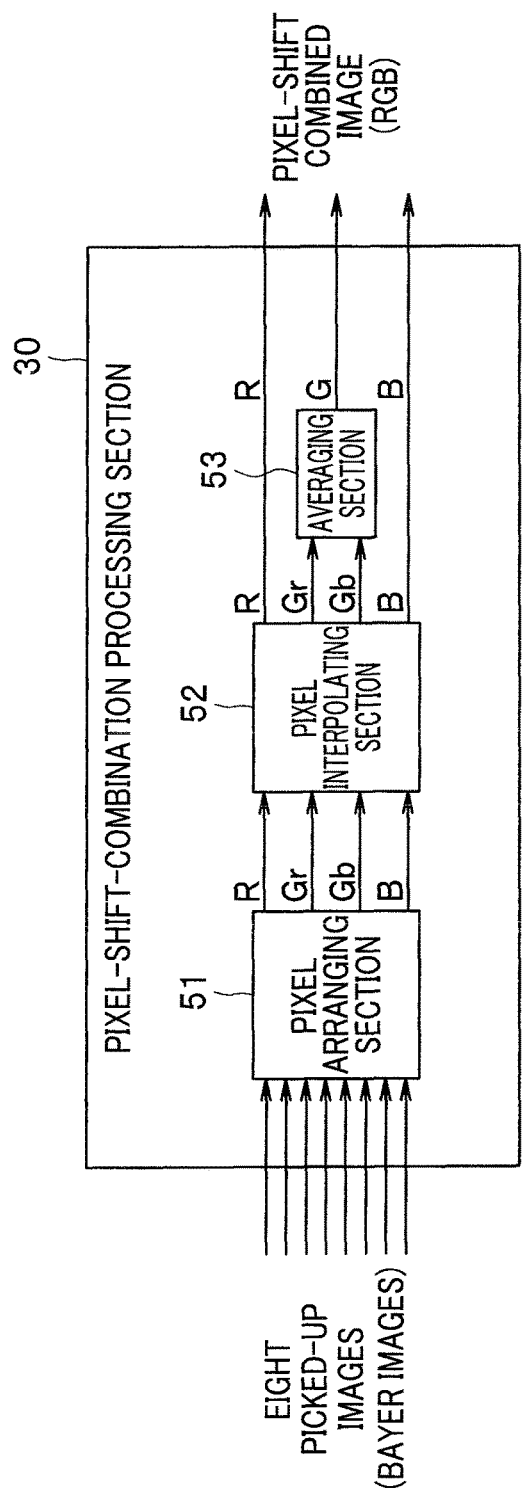
FIG. 2 is a block diagram showing a configuration of a pixel-shift-combination processing section of the first embodiment.

FIG. 2 is a block diagram showing a configuration of the pixel-shift-combination processing section 30.

The pixel-shift-combination processing section 30 includes a pixel arranging section 51, a pixel interpolating section 52, and an averaging section 53.

The pixel arranging section 51 separates eight Bayer images acquired in the high depth super resolution photographing mode respectively into R components, Gr components (G components present on a line on which the R components are present), Gb components (G components present on a line on which B components are present), and B components and arranges the components according to pixel shift positions.

Figures 3, 4:
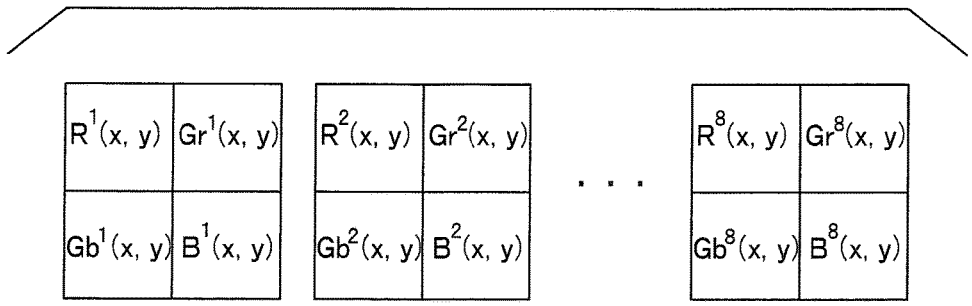
FIG. 3 is a diagram showing basic pixel arrangement of R, Gr, Gb, and B in eight Bayer images obtained by pixel shift photographing in one focus position in the first embodiment.
FIG. 4 is a diagram showing R pixel arrangement obtained by a pixel arranging section from the eight Bayer images of the pixel arrangement shown in FIG. 3 in the first embodiment.

FIG. 3 is a diagram showing a basic pixel arrangement of R, Gr, Gb, and B in the eight Bayer images obtained by pixel shift photographing in one focus position. FIG. 4 is a diagram showing an R pixel arrangement obtained by the pixel arranging section 51 from the eight Bayer images of the pixel arrangement shown in FIG. 3. FIG. 5 is a diagram showing a Gr pixel arrangement obtained by the pixel arranging section 51 from the eight Bayer images of the pixel arrangement shown in FIG. 3. FIG. 6 is a diagram showing a Gb pixel arrangement obtained by the pixel arranging section 51 from the eight Bayer images of the pixel arrangement shown in FIG. 3. FIG. 7 is a diagram showing a B pixel arrangement obtained by the pixel arranging section 51 from the eight Bayer images of the pixel arrangement shown in FIG. 3.

In the respective color components R, Gr, Gb, and B shown in FIG. 3 to FIG. 7, (x, y) indicates a pixel position in the horizontal direction (an x direction) and the vertical direction (a y direction) in the image sensor 22. A number of any one of 1 to 8 attached to an upper right corner indicates which of the eight Bayer images an image is.

The pixel arranging section 51 extracts the R components from the eight Bayer images configured by repeating the basic pixel arrangement shown in FIG. 3, rearranges the R components according to a pixel shift route of the image sensor 22 explained below with reference to FIG. 13, and generates an R combined image of a pixel arrangement in which eight R components are arrayed in a 4×4 pixel array shown in FIG. 4. Similarly, the pixel arranging section 51 respectively extracts the Gr, Gb, and B components from the eight Bayer images, rearranges the Gr, Gb, and B components according to pixel shift routes, and respectively generates a Gr combined image, a Gb combined image, and a B combined image of the pixel arrangements respectively shown in FIG. 5, FIG. 6, and FIG. 7.

The pixel interpolating section 52 interpolates R components missing in FIG. 4 on the basis of the R components around the R components, interpolates Gr components missing in FIG. 5 on the basis of the Gr components around the Gr components, interpolates Gb components missing in FIG. 6 on the basis of the Gb components around the Gb components, and interpolates B components missing in FIG. 7 on the basis of the B components around the B components.

The averaging section 53 averages the Gr combined image and the Gb combined image, which are interpolated by the pixel interpolating section 52, by, for example, adding up the Gr combined image and the Gb combined image in pixel positions corresponding to each other and dividing an added-up value by two. It is possible to reduce noise and achieve improvement of image quality through the averaging.

According to such combination processing, in the high depth super resolution photographing mode, a pixel-shift combined image having double resolution in the horizontal direction and double resolution in the vertical direction is obtained.

A focused region and the like extracted by the microcomputer 45, which is the focused-region extracting section, are explained with reference to FIG. 8 to FIG. 12. FIG. 8 to FIG. 12 show an example at a time when an object such as an insect or a spider is macro-photographed.

Figure 8:
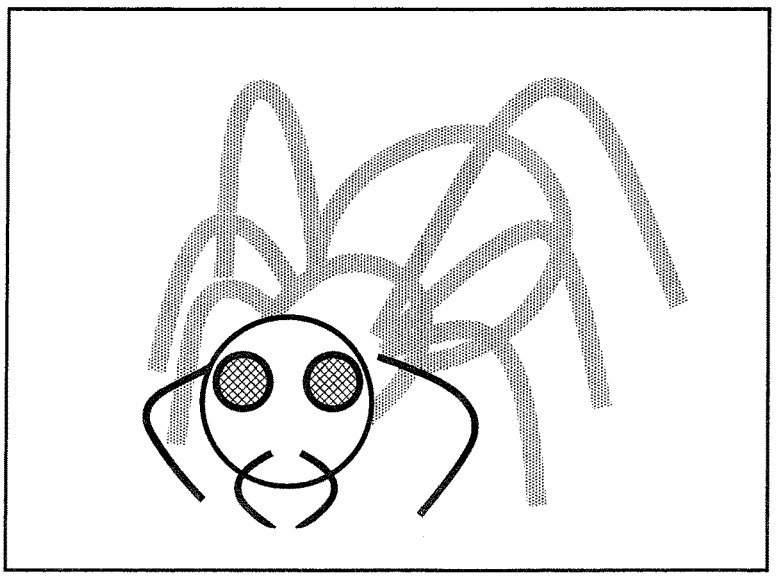
FIG. 8 is a diagram showing an example of an image photographed at a large aperture opening diameter in the first embodiment.
Figure 9:
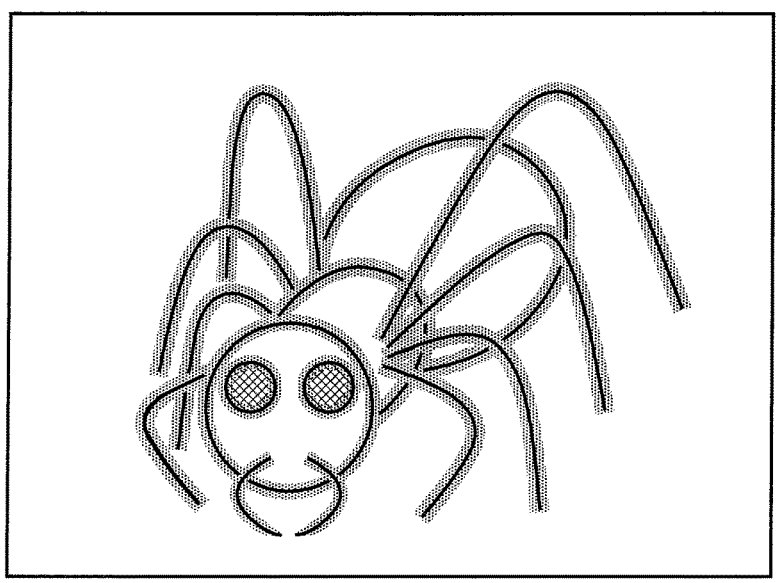
FIG. 9 is a diagram showing an example of an image photographed at a small aperture opening diameter in the first embodiment.

FIG. 8 is a diagram showing an example of an image photographed at a large aperture opening diameter. FIG. 9 is a diagram showing an example of an image photographed at a small aperture opening diameter.

In the image photographed at the large aperture opening diameter shown in FIG. 8, for example, a head and front feet of the object are focused. However, a chest, a body, rear feet, and the like considerably blur because a depth of field is small.

On the other hand, in the image photographed at the small aperture opening diameter shown in FIG. 9, the entire object is generally focused because a depth of field is large. However, sharpness of the entire object decreases because of influence of diffraction.

Figure 10:
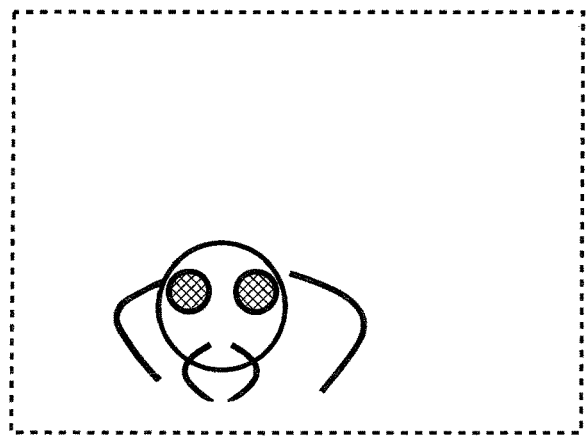
FIG. 10 is a diagram showing a state of a focused region extracted by comparing sharpnesses of the image shown in FIG. 8 and the image shown in FIG. 9 in the first embodiment.

In the present embodiment, as in a flow of processing explained below with reference to FIG. 16, the microcomputer 45, which is the focused-region extracting section, is configured to respectively calculate sharpness of each pixel in two images acquired at two different aperture diameters and extract, as a focused region, a pixel region where the image photographed at the large aperture opening diameter shown in FIG. 8 has higher sharpness than the image photographed at the small aperture opening diameter shown in FIG. 9. FIG. 10 is a diagram showing a state of a focused region extracted by comparing sharpnesses of the image shown in FIG. 8 and the image shown in FIG. 9.

Figure 11:
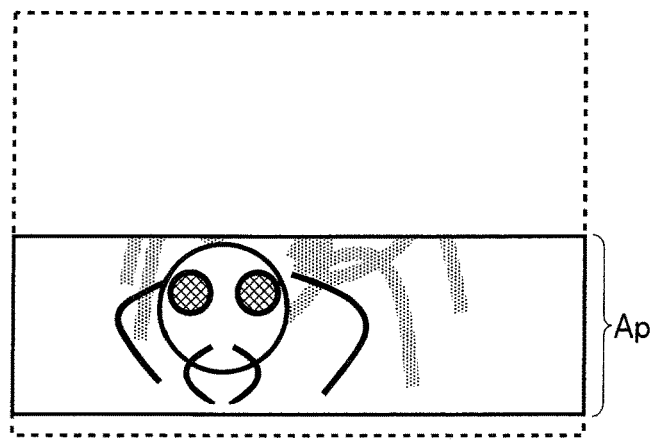
FIG. 11 is a diagram showing a pixel-shift image pickup region set by a focused-region extracting section in the first embodiment.
Figure 12:
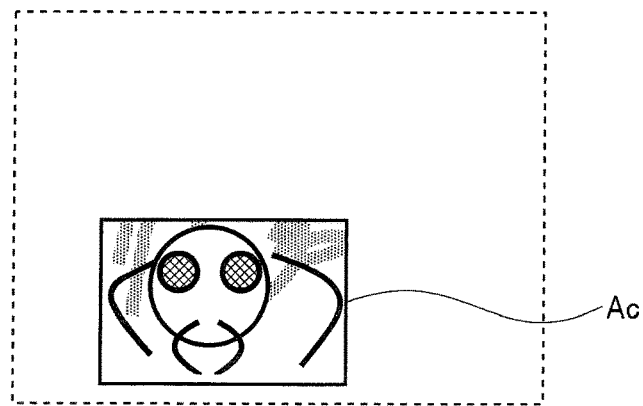
FIG. 12 is a diagram showing an image acquisition region set in the pixel-shift image pickup region by the focused-region extracting section in the first embodiment.

Further, the microcomputer 45 is configured to set a line including the extracted region as a pixel-shift image pickup region Ap (hereinafter referred to as image pickup region Ap) as shown in FIG. 11 and set a partial image region including the focused region in the image pickup region Ap, for example, a rectangular region, as an image acquisition region Ac as shown in FIG. 12. FIG. 11 is a diagram showing the image pickup region Ap set by the focused-region extracting section. FIG. 12 is a diagram showing the image acquisition region Ac set in the image pickup region Ap by the focused-region extracting section.

FIG. 13 is a diagram showing respective centering positions of pixel shift performed by the voice coil motor (VCM) 23, which is the pixel shifting section. In FIG. 13, a pixel pitch is indicated as P. When a horizontal right direction is represented as an x direction and a vertical downward direction is represented as a y direction, movement amounts in the respective centering positions are represented by (x, y).

In the present embodiment, the image sensor 22 is moved to, for example, eight different centering positions including centering positions different at non-integer multiples of a pixel pitch with respect to a certain centering position, images are photographed in the respective centering positions, and eight images obtained by the photographing are combined to acquire one pixel-shift combined image. The acquisition of such a pixel-shift combined image is performed in respective focus positions in the focus bracket photographing.

In an example shown in FIG. 13, a centering position A2 is a position shifted by (P/2,P/2) with respect to a centering position A1. A centering position A3 is a position shifted by (P/2,−P/2) with respect to the centering position A2. A centering position A4 is a position shifted by (P/2,P/2) with respect to the centering position A3. A centering position A5 is a position shifted by (0,P) with respect to the centering position A4. A centering position A6 is a position shifted by (−P/2,−P/2) with respect to the centering position A5. A centering position A7 is a position shifted by (−P/2,P/2) with respect to the centering position A6. A centering position A8 is a position shifted by (−P/2,−P/2) with respect to the centering position A7. A centering position A1 is a position shifted by (0,−P) with respect to the centering position A8.

Note that centering positions other than the centering positions in the example shown in FIG. 13 may be adopted. However, in that case, positions of pixel signals rearranged by the pixel arranging section 51 are different from the positions in the examples shown in FIG. 4 to FIG. 7.

Figure 14:
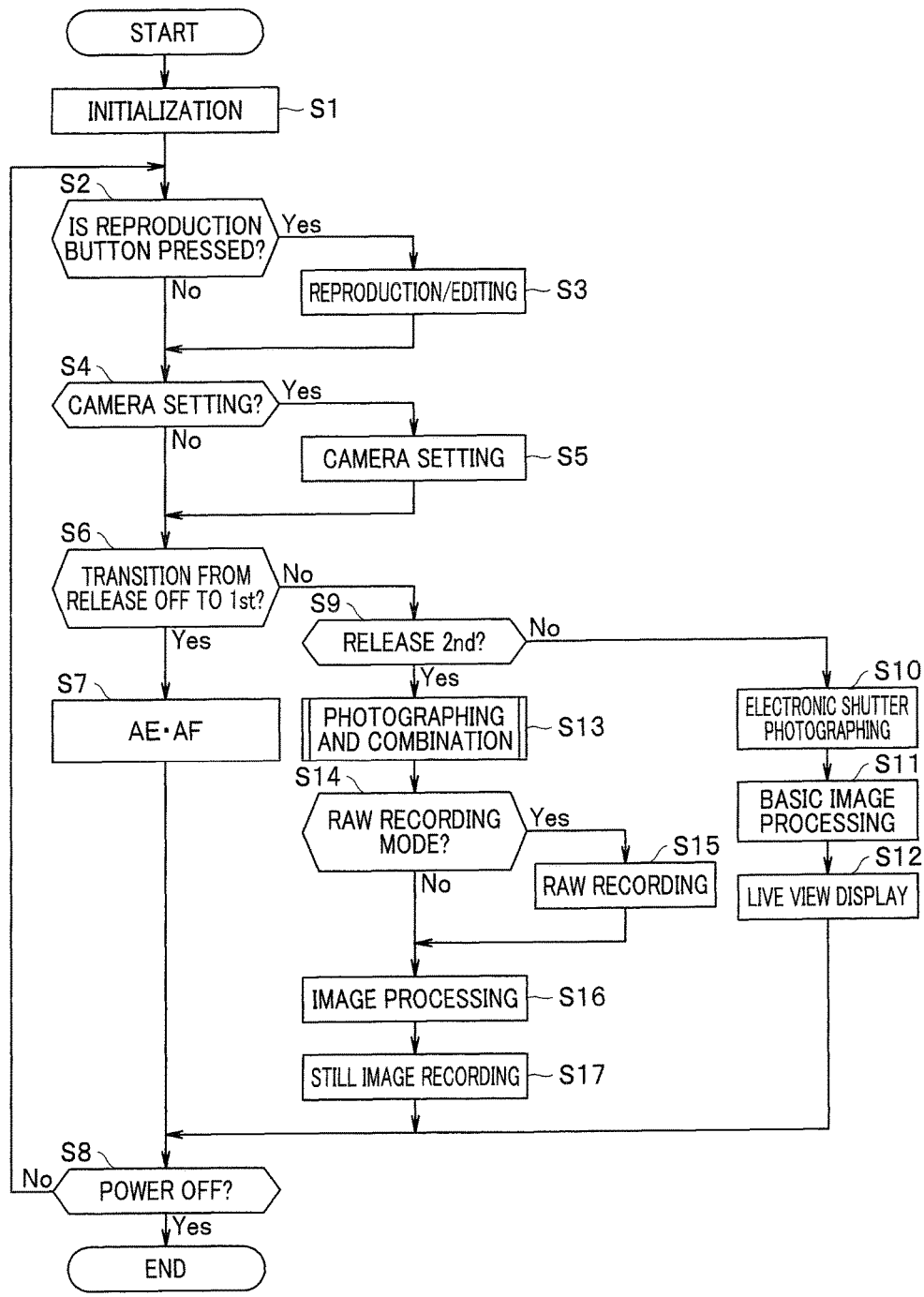
FIG. 14 is a flowchart showing a flow of main processing in the digital camera of the first embodiment.

FIG. 14 is a flowchart showing a flow of main processing in the digital camera. The processing shown in FIG. 14 is performed on the basis of the control by the microcomputer 45.

When the power button of the operation section 43 is ON-operated and the power supply of the digital camera is turned on, the main processing is started. First, the microcomputer 45 performs initialization of the digital camera (step S1).

Subsequently, the microcomputer 45 determines whether the reproduction button of the operation section 43 is operated (step S2).

When the reproduction button is operated, the microcomputer 45 performs reproduction/editing processing (step S3). The reproduction/editing processing is processing for displaying a list of files recorded in the recording medium 42 and, waiting for selection operation from the user, reproducing a selected and determined file or editing a selected image.

When the reproduction button is not operated in step S2 or the processing in step S3 is performed, the microcomputer 45 determines whether the menu button of the operation section 43 is operated and camera setting concerning the digital camera is selected (step S4).

When the camera setting is selected, the microcomputer 45 displays a menu for changing the camera setting on the monitor 38 and stands by for user operation for changing the camera setting to be performed from the operation section 43. Several examples of the camera setting include:

a photographing mode: the normal photographing mode and the high depth super resolution photographing mode, and a recording mode: the JPEG recording mode and the RAW+JPEG recording mode, explained above. However, the camera setting is not limited to these modes.

When the user operation is performed, the microcomputer 45 performs the camera setting according to operation content (step S5).

When the camera setting is not selected in step S4 or the processing in step S5 is performed, the microcomputer 45 determines whether the release button transitions from OFF to a state of 1st release ON, which is a pressed state of a first stage (a so-called half-pressed state) (step S6).

When the release button transitions to the state of the 1st release ON, at timing of the transition, the microcomputer 45 performs, with the AE processing section 29, automatic exposure (AE) control for photographing an image and performs automatic focus control (AF) with the AF processing section 28 (step S7). Consequently, after the 1st release button is pressed, so-called AE lock and AF lock are performed.

The microcomputer 45 determines whether the power button is OFF-operated (step S8). When the power button is not OFF-operated, the microcomputer 45 returns to step S2 and repeatedly performs the processing explained above.

When the release button does not transition to the state of the 1st release ON in step S6, the microcomputer 45 determines whether the release button is in a state of 2nd release ON (a so-called full-pressed state), which is a pressed state of a second stage (step S9).

When the release button is not in the state of the 2nd release ON, the microcomputer 45 changes the mechanical shutter 21 to an open state, performs automatic exposure (AE) control for live view with the AE processing section 29, and performs image photographing for one image by an electronic shutter (step S10).

The microcomputer 45 performs, on the image photographed in this way, basic image processing in which several kinds of image processing performed on a recorded image are, for example, omitted (step S11) and displays an image subjected to the basic image processing on the monitor 38 as live view (step S12).

Thereafter, the microcomputer 45 shifts to the processing in step S8 and determines whether the power button is OFF-operated. When the power button is not OFF-operated, the microcomputer 45 returns to step S2 and repeatedly performs the processing explained above.

On the other hand, when the release button is in the state of the 2nd release ON in step S9, the microcomputer 45 executes photographing and combination processing explained below with reference to FIG. 15 if the digital camera is set in the high depth super resolution photographing mode (step S13). Note that, when the digital camera is set in the normal photographing mode, the microcomputer 45 executes the normal photographing processing.

Subsequently, the microcomputer 45 determines whether a RAW recording mode is set (step S14). When the RAW recording mode is set, the microcomputer 45 records a RAW image in the recording medium 42 as a file (step S15).

When the RAW recording mode is not set in step S14 or the processing in step S15 is performed, the microcomputer 45 performs, with the image processing section 32, image processing on the image obtained by the photographing (step S16).

Thereafter, the microcomputer 45 JPEG-compresses, with the JPEG processing section 36, the image subjected to the image processing, adds a header to the image according to the control by the microcomputer 45, and records the image in the recording medium 42 as a JPEG file (step S17).

When the processing in step S17 is performed, the microcomputer 45 shifts to the processing in step S8 and determines whether the power button is OFF-operated.

In this way, when the power button is OFF-operated in step S8, the microcomputer 45 ends the main processing.

Figure 15:
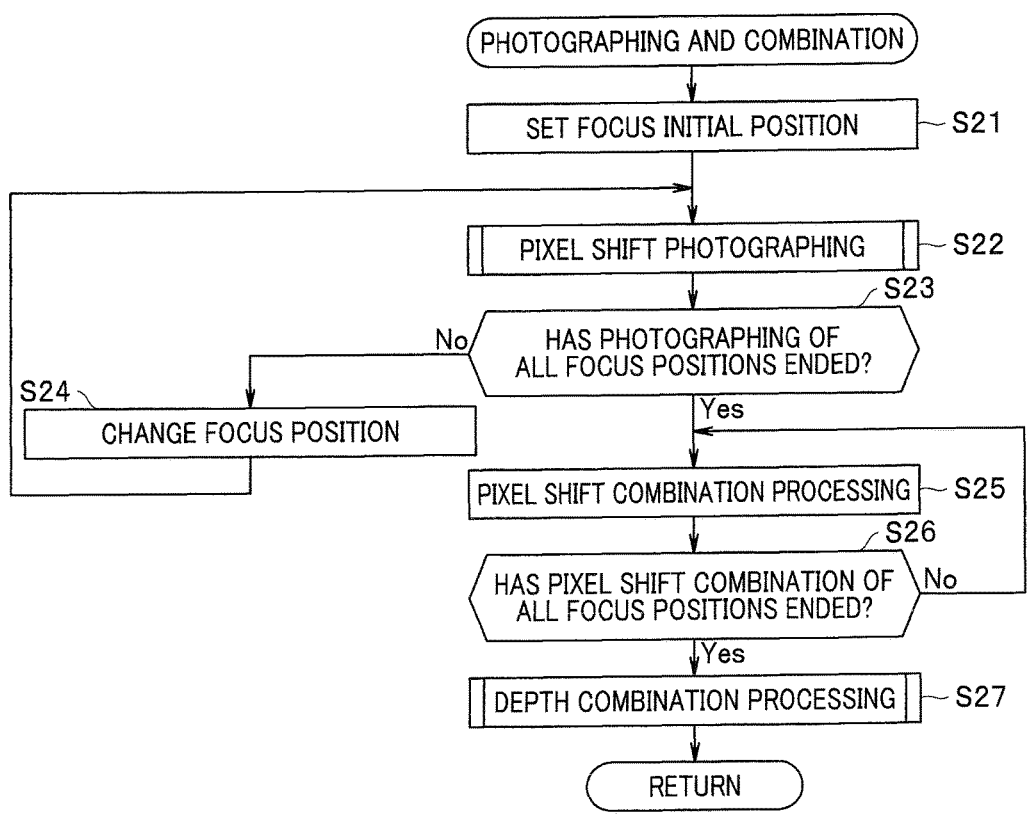
FIG. 15 is a flowchart showing a flow of photographing and combination processing in the digital camera of the first embodiment.

FIG. 15 is a flowchart showing a flow of the photographing and combination processing in the digital camera.

When starting the processing, the microcomputer 45 sets a focus position of the lens 11 to an initial position via the microcomputer 15 and the driver 13 (step S21).

The microcomputer 45 performs pixel shift photographing processing explained below with reference to FIG. 16 (step S22). An image set including the plurality of image data in the different relative positions is acquired by the pixel shift photographing processing.

Subsequently, the microcomputer 45 determines whether the pixel shift photographing in all focus positions in the focus bracket photographing has ended (step S23).

When determining that the pixel shift photographing in all the focus positions has not ended yet, the microcomputer 45 changes the focus position (step S24) and then returns to step S22 and performs the pixel shift photographing processing. That is, in the pixel shift photographing, position accuracy smaller than the pixel pitch (e.g., position accuracy of a half pixel pitch) is requested. Therefore, the focus position is not changed during a series of the pixel shift photographing in step S22. The focus position is changed according to necessity when the series of pixel shift photographing ends.

When it is determined in step S23 that the pixel shift photographing in all the focus positions has ended, the microcomputer 45 performs, with the pixel-shift-combination processing section 30, the pixel-shift combination processing of an image set including eight images acquired in one focus position and generates one pixel-shift combined image (step S25). The pixel-shift combination processing is performed on only image data of the image acquisition region Ac.

The microcomputer 45 determines whether the pixel-shift combination processing for image sets acquired in all the focus positions has ended (step S26).

When determining that the pixel-shift combination processing for the image sets acquired in all the focus positions has not ended yet, the microcomputer 45 returns to step S25 explained above and performs the pixel-shift combination processing for an image set acquired in a next focus position.

In this way, when determining in step S26 that the pixel-shift combination processing for the image sets acquired in all the focus positions has ended, the microcomputer 45 performs depth combination processing explained below with reference to FIG. 17 (step S27) and returns from this processing to the processing shown in FIG. 14.

Figure 16:
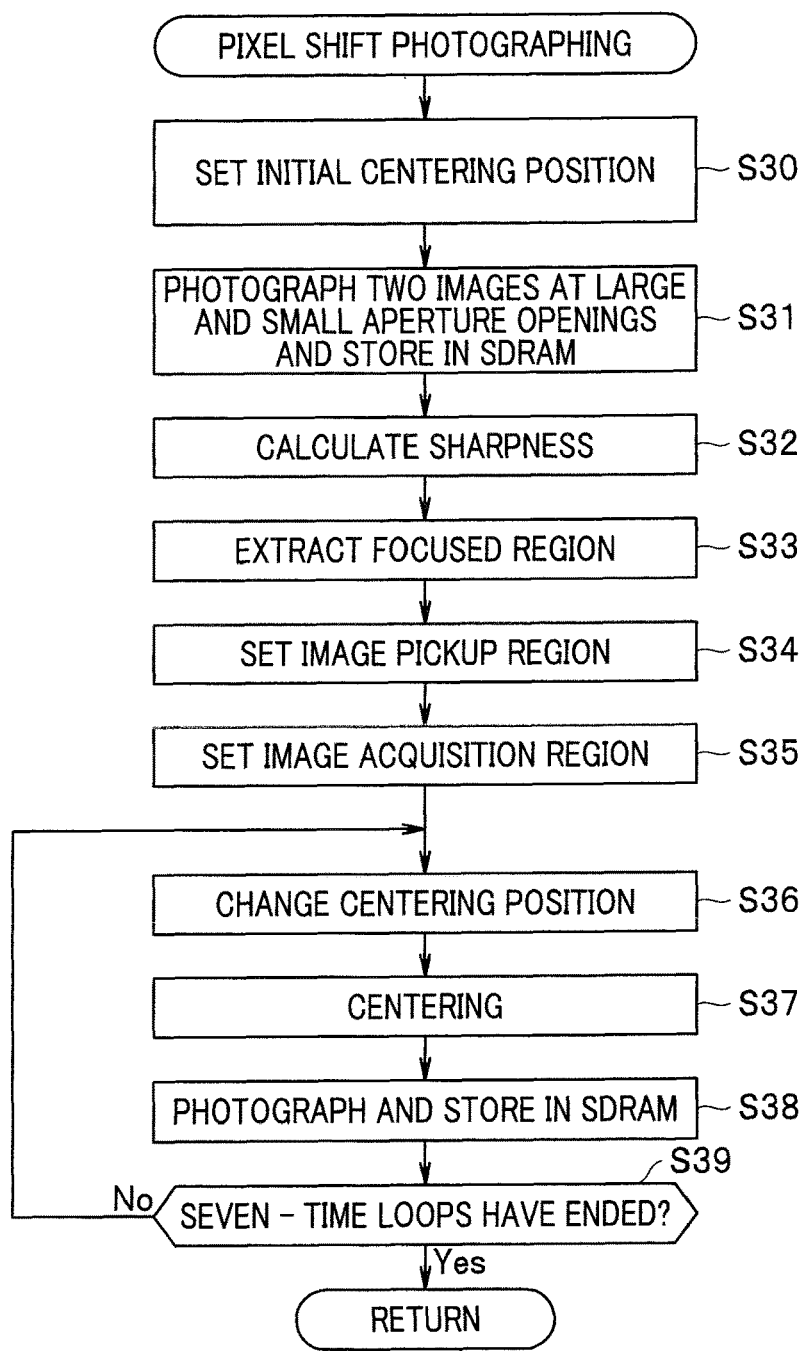
FIG. 16 is a flowchart showing a flow of pixel shift photographing processing in the digital camera of the first embodiment.

FIG. 16 is a flowchart showing a flow of the pixel shift photographing processing in the digital camera.

When starting the processing, the microcomputer 45 moves, with the voice coil motor (VCM) 23, the image sensor 22 to an initial centering position (e.g., the centering position A1 shown in FIG. 13) (step S30).

Subsequently, the microcomputer 45 sets the aperture 12 to two different aperture diameters via the microcomputer 15 and the driver 13, causes the image sensor 22 to acquire images at the respective aperture diameters, and causes the SDRAM 27 to store the images (step S31). The two different aperture diameters set in the aperture 12 are, for example, an aperture diameter set by the automatic exposure (AE) control in step S7 in FIG. 14 and a minimum aperture diameter that can be set in the aperture 12. It is assumed that an image acquired at the aperture diameter set by the automatic exposure (AE) control (an image photographed at a large aperture opening diameter) is, for example, as shown in FIG. 8 and an image acquired at the minimum aperture diameter (an image photographed at a small aperture opening diameter) is, for example, as shown in FIG. 9.

Subsequently, the microcomputer 45 respectively calculates sharpness of each pixel forming the two images acquired at the two different aperture diameters (step S32).

The microcomputer 45 extracts, as a focused region, a region in the image photographed at the large aperture opening diameter shown in FIG. 8 where sharpness is higher than sharpness of the image photographed at the small aperture opening diameter shown in FIG. 9 (step S33). Note that the extraction of the focused region is performed by comparing the sharpnesses of the two images acquired at the different aperture diameters. However, as illustrated in second and third embodiments explained below, other appropriate methods may be used. FIG. 10 referred to above shows a state of the focused region extracted by comparing the sharpnesses of the image shown in FIG. 8 and the image shown in FIG. 9 in this way.

Further, the microcomputer 45 sets the image pickup region Ap shown in, for example, FIG. 11, in a partial image region including, on a readout line, the entire focused region extracted in step S33 (step S34). In a loop of steps S36 to S39 to be explained below, only image data of the set image pickup region Ap (i.e., image data of only the partial image region including the focused region) is read out from the image sensor 22 and stored in the SDRAM 27. Consequently, it is possible to remarkably improve a frame rate of the image sensor 22. It is possible to reduce a memory capacity necessary for the SDRAM 27.

Subsequently, the microcomputer 45 sets, as shown in FIG. 12, as the image acquisition region Ac, for example, a rectangular region in the image pickup region Ap set in step S34 (step S35). The image acquisition region Ac is a region equal to the image pickup region Ap or a partial region in the image pickup region Ap and a region including the entire focused region shown in FIG. 10. An inclusion relation of the respective regions is indicated as follows:

the image pickup region Ap⊇ the image acquisition region Ac⊇ the focused region

The pixel-shift combination processing shown in step S25 in FIG. 15 is performed on only the set image acquisition region Ac as explained above. Consequently, it is possible to reduce a processing load of the pixel-shift-combination processing section 30 and reduce a processing time.

Subsequently, the microcomputer 45 changes a centering position of the image sensor 22 (step S36). The change of the centering position is performed, for example, in the order indicated by A1 to A8 in FIG. 13 explained above.

The voice coil motor (VCM) 23 receives the change of the centering position of the image sensor 22 by the microcomputer 45 and moves the image sensor 22 to a new centering position (step S37).

In the new centering position to which the image sensor 22 is moved, photographing of an image is performed by the image sensor 22. Image data of the image pickup region Ap shown in FIG. 11 is read out from the image sensor 22 and stored in the SDRAM 27 (step S38).

Thereafter, the microcomputer 45 determines whether the loop of steps S36 to S39 is repeatedly performed seven times, that is, whether eight images in total including one image having an AE setting aperture value set in the initial centering position A1 in step S30 and acquired in step S31 and seven images of the image pickup region Ap in the centering positions A2 to A8 acquired in step S38 by the seven-time loops are acquired (step S39).

When determining that the seven-time loops have not ended yet, the microcomputer 45 returns to step S36 and performs processing of a next centering position.

On the other hand, when determining in step S39 that the seven-time loops have ended, the microcomputer 45 returns from this processing to the processing shown in FIG. 15.

Note that, since the image sensor 22 that performs readout in units of a line is assumed, the image data outputted from the image sensor 22 and stored in the SDRAM 27 is the image data of the image pickup region Ap. However, in the case of the image sensor 22 that can perform readout, for example, in units of a pixel (units of an address of a pixel), the image data outputted from the image sensor 22 and stored in the SDRAM 27 may be image data of the image acquisition region Ac. Consequently, it is possible to further improve the frame rate of the image sensor 22 and further reduce the memory capacity necessary for the SDRAM 27.

One image photographed in step S31 is also used as an image acquired in the first pixel shift photographing. However, the pixel shift photographing processing is not limited to this. For example, the processing in step S31 may be performed as, for example, preliminary photographing for only detecting a focused region to acquire an image having lower resolution than in regular photographing. The processing in steps S36 to S39 may be performed as the regular photographing to perform the loop eight times. In this case, an entire view angle image (the "entire view angle image" in this specification means that an image is an entire image acquired from the image sensor 22 as an image, that is, is not a partial image at a partial angle of view extracted from the acquired image) is acquired in a first time of the loop. Only image data of the image pickup region Ap (or the image acquisition region Ac) is acquired from the second to eighth loops.

Figure 17:
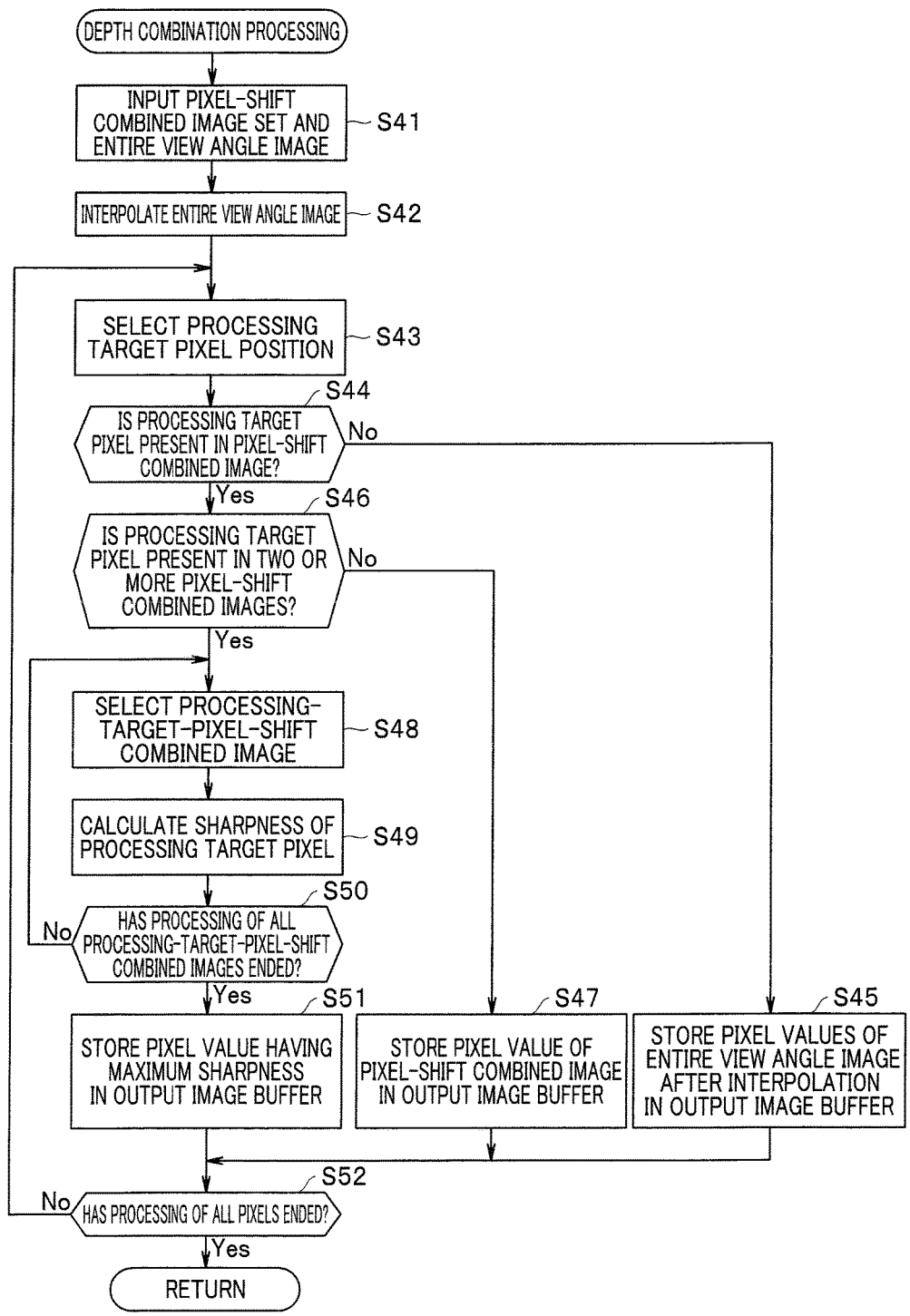
FIG. 17 is a flowchart showing a flow of depth combination processing in the digital camera of the first embodiment.

FIG. 17 is a flowchart showing a flow of the depth combination processing in the digital camera.

When starting the processing, the depth-combination processing section 31 inputs, from the SDRAM 27, pixel-shift combined images and entire view angle images in a plurality of focus positions in the focus bracket photographing (however, it goes without saying that the depth-combination processing section 31 does not need to simultaneously input all data and may sequentially input data from data necessary for the processing) (step S41).

The entire view angle image is, for example, an image acquired at a minimum aperture diameter of the two images acquired in step S31 of the pixel shift photographing processing shown in FIG. 16 in any one of the plurality of focus positions in the focus bracket photographing (e.g., the focus initial position set in step S21 in FIG. 15).

The image acquired at the minimum aperture diameter is used as the entire view angle image because sharpness of the image in a region other than a focused region (an unfocused region) is considered to be higher than sharpness of an image acquired at an aperture diameter set by the automatic exposure (AE) control. However, a blur due to un-focusing and a blur due to diffraction are different in a state of a blur. Therefore, the image acquired at the aperture diameter set by the automatic exposure (AE) control may be used as the entire view angle image according to necessity.

The depth combination is not performed using entire view angle images in the plurality of focus positions in the focus bracket photographing because the unfocused region is a region originally having low sharpness and an effect of improving sharpness cannot be expected much even if the depth combination is performed. In this way, the depth combination processing is performed concerning only the image data of the image acquisition region Ac on which the pixel-shift combination processing is performed. Therefore, it is possible to reduce a processing load of the depth-combination processing section 31 and reduce a processing time.

Subsequently, the microcomputer 45 performs interpolation processing of the entire view angle image and generates a highly accurate entire view angle image having resolution same as resolution of a pixel-shift combined image (step S42).

Subsequently, the microcomputer 45 selects a processing-target pixel position in the highly accurate entire view angle image having the resolution same as the resolution of the pixel-shift combined image (step S43). The selection of the pixel position is performed, for example, in order of raster scan.

The microcomputer 45 determines whether the processing target pixel selected in step S43 is present in any one of the pixel-shift combined images in the plurality of focus positions in the focus bracket photographing (step S44). The pixel-shift combination processing is performed concerning only the image acquisition region Ac as explained above. Therefore, the processing target pixel is sometimes absent in the pixel-shift combined images. Therefore, the determination in step S44 is performed.

When determining that the processing target pixel is absent in all of the pixel-shift combined images, the microcomputer 45 stores, in an output image buffer in the SDRAM 27, a pixel value of the processing target pixel in the entire view angle image after the interpolation processing (step S45).

When determining that the processing target pixel is present in any one of the pixel-shift combined images, the microcomputer 45 further determines whether the processing target pixel is present in two or more pixel-shift combined images (step S46).

When determining that the processing target pixel is present only in one pixel-shift combined image, the microcomputer 45 stores, in the output image buffer in the SDRAM 27, a pixel value of the processing target pixel in the pixel-shift combined image (step S47).

On the other hand, when determining in step S46 that the processing target pixel is present in two or more pixel-shift combined images, the microcomputer 45 selects one of the pixel-shift combined images in which the processing target pixel is determined as being present (step S48).

The microcomputer 45 calculates sharpness of the processing target pixel in the pixel-shift combined image selected in step S48 (step S49).

Subsequently, the microcomputer 45 determines whether the calculation of sharpness of the processing target pixel has ended concerning all the pixel-shift combined images in which the processing target pixel is present (step S50). When a pixel-shift combined image not processed yet is present, the microcomputer 45 returns to step S48 and performs the processing concerning a next pixel-shift combined image as explained above.

When determining in step S50 that the calculation of sharpness of the processing target pixel has ended concerning all the pixel-shift combined images in which the processing target pixel is present, the microcomputer 45 stores, in the output image buffer in the SDRAM 27, a pixel value of the processing target pixel having maximum sharpness (step S51).

When the processing of any one of step S45, step S47, and step S51 is performed in this way, the microcomputer 45 determines whether the processing concerning all pixel positions in the highly accurate entire view angle image having the resolution same as the resolution of the pixel-shift combined image has ended (step S52).

When determining that the processing concerning all the pixel positions has not ended yet, the microcomputer 45 returns to step S43, selects a next pixel position, and performs the processing explained above.

On the other hand, when determining in step S52 that the processing concerning all the pixel positions has ended, the microcomputer 45 returns from this processing to the processing shown in FIG. 15.

Figure 18:
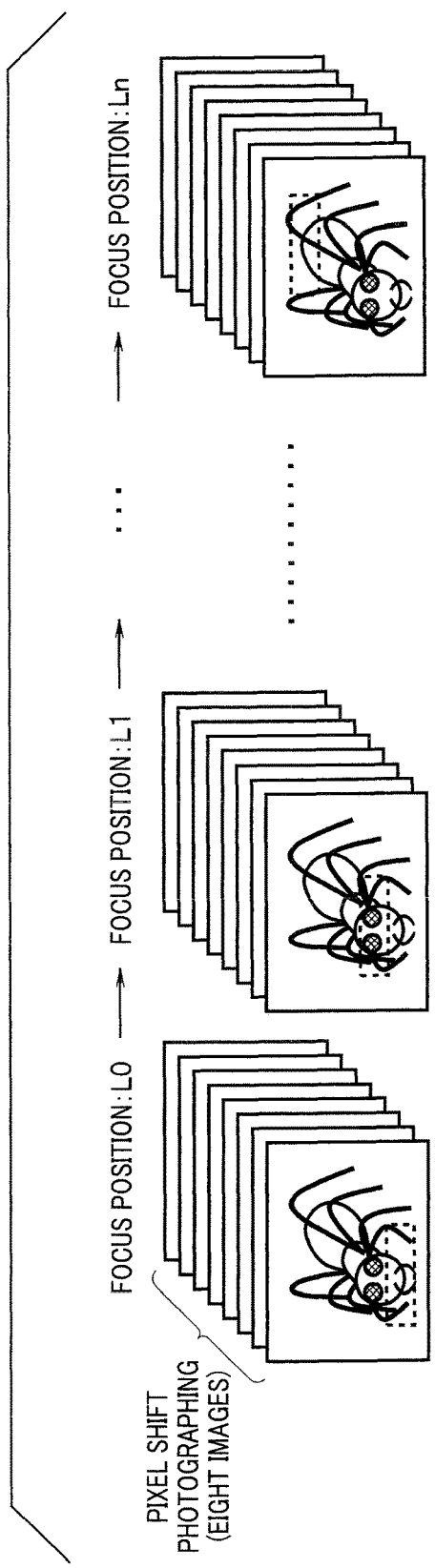
FIG. 18 is a diagram showing an example of an image data amount at a time when images for performing a pixel shift and depth combination according to a method same as a conventional method compared with a method of the first embodiment are acquired.

FIG. 18 is a diagram showing an example of an image data amount at a time when images for performing the pixel shift and the depth combination according to a method same as the conventional method compared with the method of the present embodiment are acquired.

In this case, in respective focus positions L0 to Ln, for example, eight entire view angle images are pixel-shift-photographed and acquired. Therefore, the number of acquired entire view angle images is 8(n+1). For example, when ten-point focus bracket photographing is performed, image data for eighty images is acquired and the pixel-shift combination processing and the depth combination processing are performed.

Figure 19:
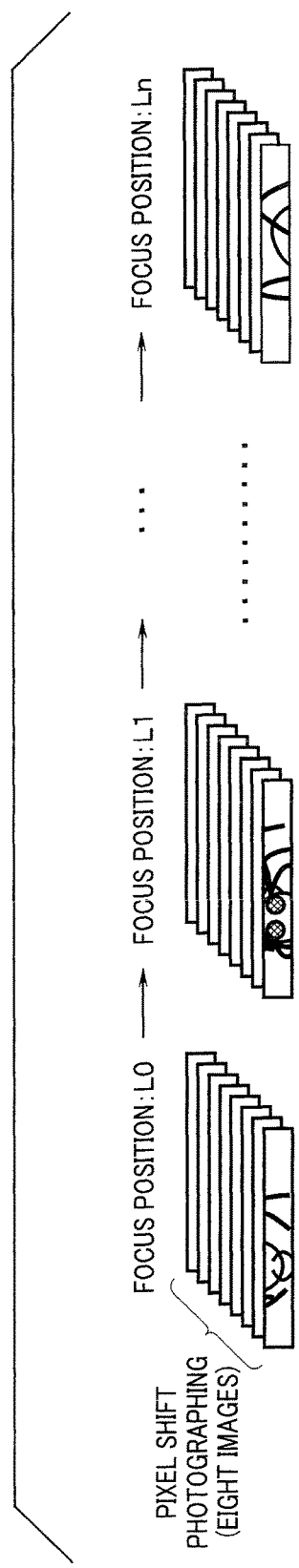
FIG. 19 is a diagram schematically showing an example of an image data amount at a time when images for performing the pixel shift and the depth combination according to the method of the first embodiment are acquired.

On the other hand, FIG. 19 is a diagram schematically showing an example of an image data amount at a time when images for performing the pixel shift and the depth combination according to the method of the present embodiment are acquired.

When the method of the present embodiment is used, schematically, the image data of the image pickup region Ap shown in FIG. 11 is sufficient as image data outputted from the image sensor 22. Therefore, when the image pickup region Ap is, for example, one eighth of an entire image, image data of one eighth of the image data shown in FIG. 18 only has to be acquired (however, more accurately, since the two entire view angle images are acquired as explained with reference to FIG. 16, an image data amount to be acquired is slightly larger, but still) and it is possible to greatly reduce a necessary data amount, reduce a processing load, and improve processing speed.

According to the first embodiment explained above, concerning the focus position where the focused region is extracted, the pixel-shift combination processing is performed concerning only the partial image region including the focused region. Therefore, a processing load of the pixel-shift combination processing is reduced. It is possible to reduce a time period required for processing of an image, save a memory capacity, and generate a high-resolution image having a large depth of field.

In this case, concerning the focus position where the focused region is extracted, the image data acquired after the focused region is extracted is set as the image data of only the partial image region including the focused region. Therefore, further, it is possible to reduce a time period required for acquisition of an image. It is possible to further save the memory capacity.

Only when a pixel position common to two or more pixel-shift combined image data is present, the depth processing section performs the depth combination processing on a pixel in the pixel position. Therefore, a processing load is reduced concerning the depth combination processing as well. It is possible to further reduce the time period required for processing of an image and further save the memory capacity.

The sharpnesses of the respective pixels in the two images at the different aperture opening diameters are calculated. The region where the sharpness of the pixel is higher in the same pixel position in the image photographed at the large aperture opening diameter is extracted as the focused region. Therefore, it is possible to perform highly accurate extraction of a focused region based on the two images.

In this case, if the focused region is highly accurately extracted, it is unnecessary to secure the image acquisition region Ac rather large taking into account a margin. Therefore, it is possible to appropriately reduce the time period required for acquisition and processing of an image and appropriately save the memory capacity. It is also possible to appropriately reduce the load of the pixel-shift combination processing and the load of the depth combination processing.

Second Embodiment

Figure 20:
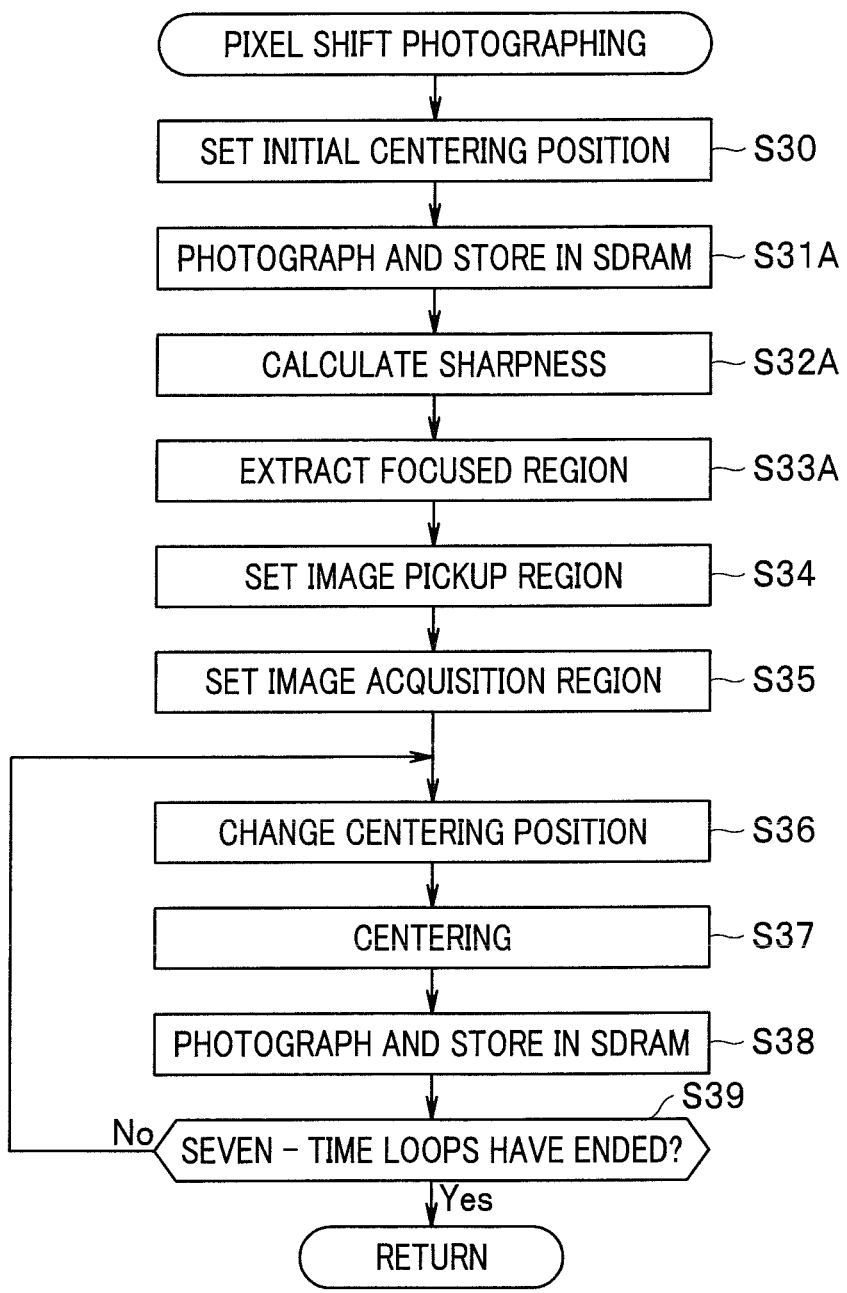
FIG. 20 is a flowchart showing a flow of pixel shift photographing processing in a digital camera of a second embodiment of the present invention.

FIG. 20 shows a second embodiment of the present invention and is a flowchart showing a flow of pixel shift photographing processing in a digital camera.

In the second embodiment, explanation of portions same as the portions in the first embodiment is omitted as appropriate by, for example, attaching the same reference numerals and signs to the portions. Only differences are mainly explained.

In the first embodiment explained above, the extraction of the focused region is performed by comparing the sharpnesses of the two images acquired at the different aperture diameters. However, in the present embodiment, a region where sharpness is equal to or larger than a predetermined value in one image is extracted as a focused region.

That is, in the present embodiment, the processing shown in FIG. 20 is executed instead of the processing shown in FIG. 16 in the first embodiment.

When starting the processing shown in FIG. 20 and performing the processing in step S30 explained above, the microcomputer 45 sets the aperture 12 to the aperture diameter set by the automatic exposure (AE) control in step S7 in FIG. 14 via the microcomputer 15 and the driver 13, causes the image sensor 22 to acquire an image, and causes the SDRAM 27 to store the image (step S31A).

Subsequently, the microcomputer 45 calculates sharpness of acquired one image for each of pixels (step S32A).

Subsequently, the microcomputer 45 extracts, as a focused region, a region including a set of pixels, calculated sharpness of which is equal to or larger than a predetermined value (step S33A).

Thereafter, the microcomputer 45 performs the processing in steps S34 to S39 as explained above. When determining in step S39 that the seven-time loops have ended, the microcomputer 45 returns from this processing to the processing shown in FIG. 15.

According to the second embodiment explained above, an effect substantially the same as the effect in the first embodiment is achieved. An entire view angle image acquired to extract a focused region in the respective focus positions of the focus bracket photographing only has to be one entire view angle image. Therefore, compared with the first embodiment in which two entire view angle images are necessary, it is possible to further reduce the photographing time of an image, further reduce the memory capacity necessary for the SDRAM 27, and reduce sharpness calculation processing in the depth-combination processing section 31.

More specifically, for example, it is assumed that the number of images acquired in one focus position for the pixel-shift combination processing is eight and the number of focus positions in the focus bracket photographing is ten. In this case, in the configuration of the first embodiment explained above, it is necessary to acquire two entire view angle images in one focus position. Therefore, the number of entire view angle images acquired in the ten focus positions is twenty. On the other hand, with the configuration of the present embodiment, only one entire view angle image has to be acquired in one focus position. Therefore, the number of entire view angle images acquired in the ten focus positions is ten. In this way, in the present embodiment, it is possible to more greatly reduce image data amount to be acquired (and a memory amount and a processing load) than in the first embodiment explained above.

Third Embodiment

Figure 21:
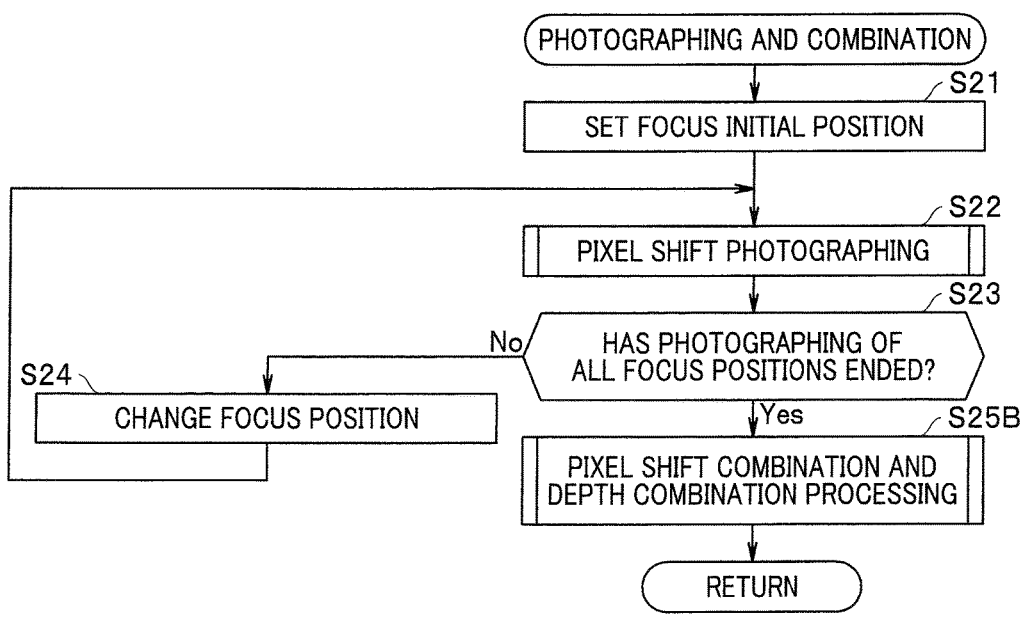
FIG. 21 is a flowchart showing a flow of photographing and combination processing in a digital camera of a third embodiment of the present invention.

FIG. 21 to FIG. 24 show a third embodiment of the present invention. FIG. 21 is a flowchart showing a flow of photographing and combination processing in the digital camera.

In the third embodiment, explanation of portions same as the portions in the first and second embodiments explained above is omitted as appropriate by, for example, attaching the same reference numerals and signs to the portions. Only differences are mainly explained.

In the first embodiment explained above, the focused region is extracted by comparing the sharpnesses of the two images acquired at the different aperture diameters. In the second embodiment explained above, the region where sharpness in one image is equal to or larger than the predetermined value is extracted as the focused region.

However, in the present embodiment, the focused region is extracted by comparing sharpnesses of an entire view angle image acquired first in a certain focus position and an entire view angle image obtained by performing depth combination of entire view angle images acquired first in already-acquired respective focus positions. An image of the image pickup region Ap set on the basis of the extracted focused region is acquired second or later in the certain focus position.

When starting the processing shown in FIG. 21, the microcomputer 45 performs the processing in steps S21 to S24 explained above. When determining in step S23 that pixel shift photographing in all the focus positions has ended, the microcomputer 45 performs pixel shift combination and depth combination processing explained below with reference to FIG. 23 (step S25B) and then returns from this processing to the processing shown in FIG. 14.

Figure 22:
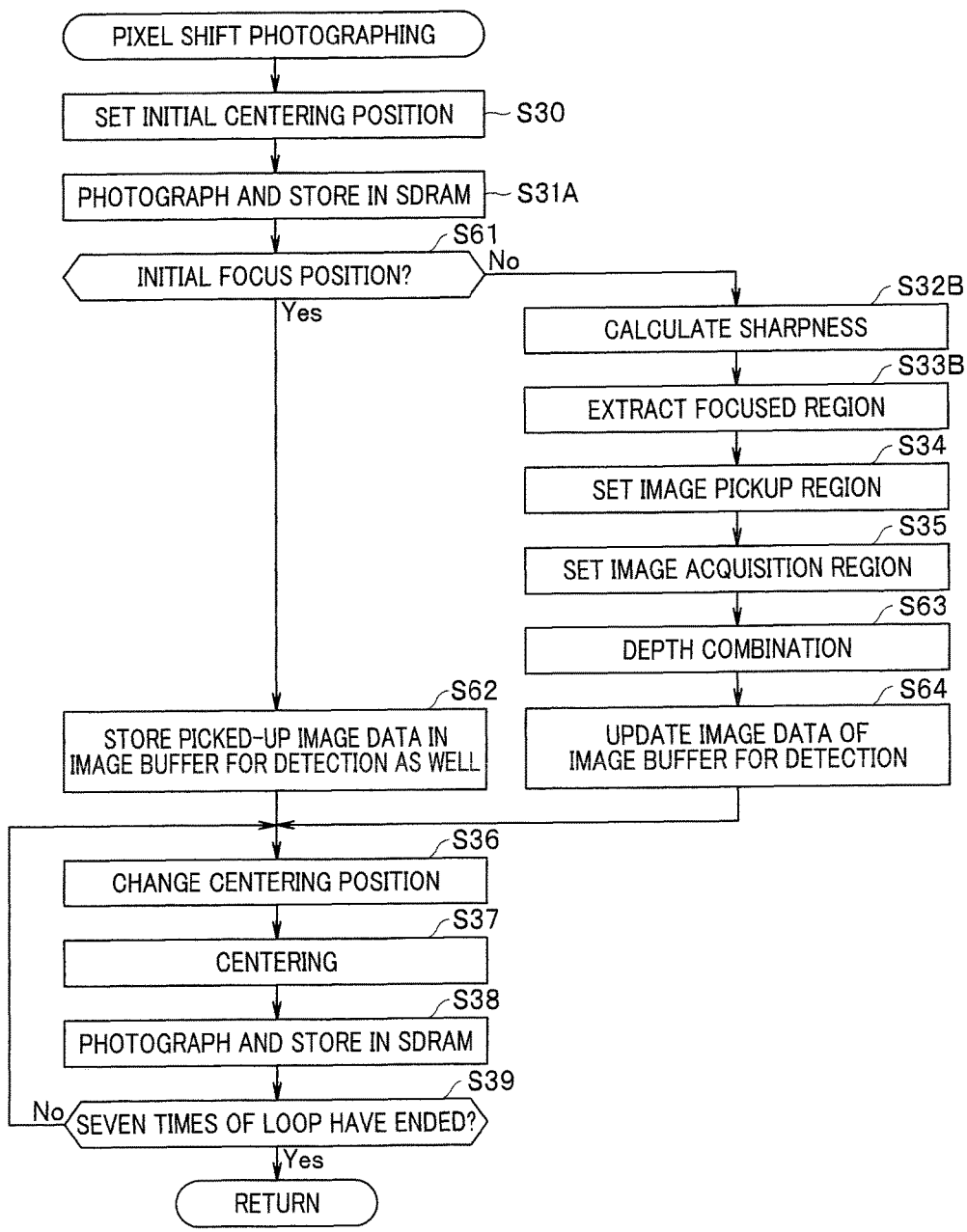
FIG. 22 is a flowchart showing a flow of pixel shift photographing processing in the digital camera of the third embodiment.

FIG. 22 is a flowchart showing a flow of pixel shift photographing processing in the digital camera.

When entering the processing in step S22 in FIG. 21, the microcomputer 45 performs the processing in step S30 and step S31A explained above and determines whether the processing shown in FIG. 22 is processing in an initial focus position, that is, whether the processing is first processing in a loop of steps S22 to S24 in FIG. 21 (i.e., processing in a focus initial position set in step S21) (step S61).

When determining that the processing is the processing in the initial focus position, the microcomputer 45 not only stores, for pixel-shift combination processing, the entire view angle image data acquired in step S31A but also stores the entire view angle image data in an image buffer for detection in the SDRAM 27 as a combined image for detection (step S62). The image buffer for detection is a storage region in the SDRAM 27 used for extracting a focused region and setting the image acquisition region Ac.

Thereafter, the microcomputer 45 performs the processing in steps S36 to S39 as explained above. Therefore, when the processing shown in FIG. 22 is the processing in the initial focus position, the extraction of a focused region is not performed. Therefore, seven images acquired by seven-time loops in processing in step S38 are also entire view angle images.

On the other hand, when determining in step S61 that the processing is not the processing in the initial focus position, the microcomputer 45 respectively calculates sharpness of each pixel forming two images, that is, the entire view angle combined image for detection stored in the image buffer for detection and the entire view angle image acquired in step S31A (step S32B).

Subsequently, concerning the image acquired in step S31A, the microcomputer 45 further extracts, as a focused region, a region where sharpness is higher than the sharpness of the combined image for detection stored in the image buffer for detection among regions where sharpness is equal to or larger than a predetermined value (a predetermined value enough for regarding that the image is focused) (step S33B).

The microcomputer 45 performs the processing in step S34 and step S35 explained above and further performs, on the basis of the sharpness calculated in step S32B, with the depth-combination processing section 31, depth combination of the combined image for detection stored in the image buffer for detection and the image acquired in step S31A (step S63).

Thereafter, the microcomputer 45 overwrites the combined image for detection subjected to the depth combination in step S63 on the combined image for detection of the image buffer for detection and performs update of the image data (step S64). Consequently, sharpness of an image acquired in step S31A when the microcomputer 45 enters the loop of the steps S22 to S24 next time is compared with sharpness of the updated combined image for detection in the image buffer for detection and a focused region is extracted.

Thereafter, as in the case where it is determined that the processing is the processing in the initial focus position, the processing in steps S36 to S39 is performed as explained above. However, when the processing shown in FIG. 22 is not the processing in the initial focus position, the seven images acquired in the seven-time loops in the processing in step S38 are images in the image pickup region Ap.

When determined in step S39 that the seven-time loops have ended, the microcomputer 45 returns from this processing to the processing shown in FIG. 21.

Figure 23:
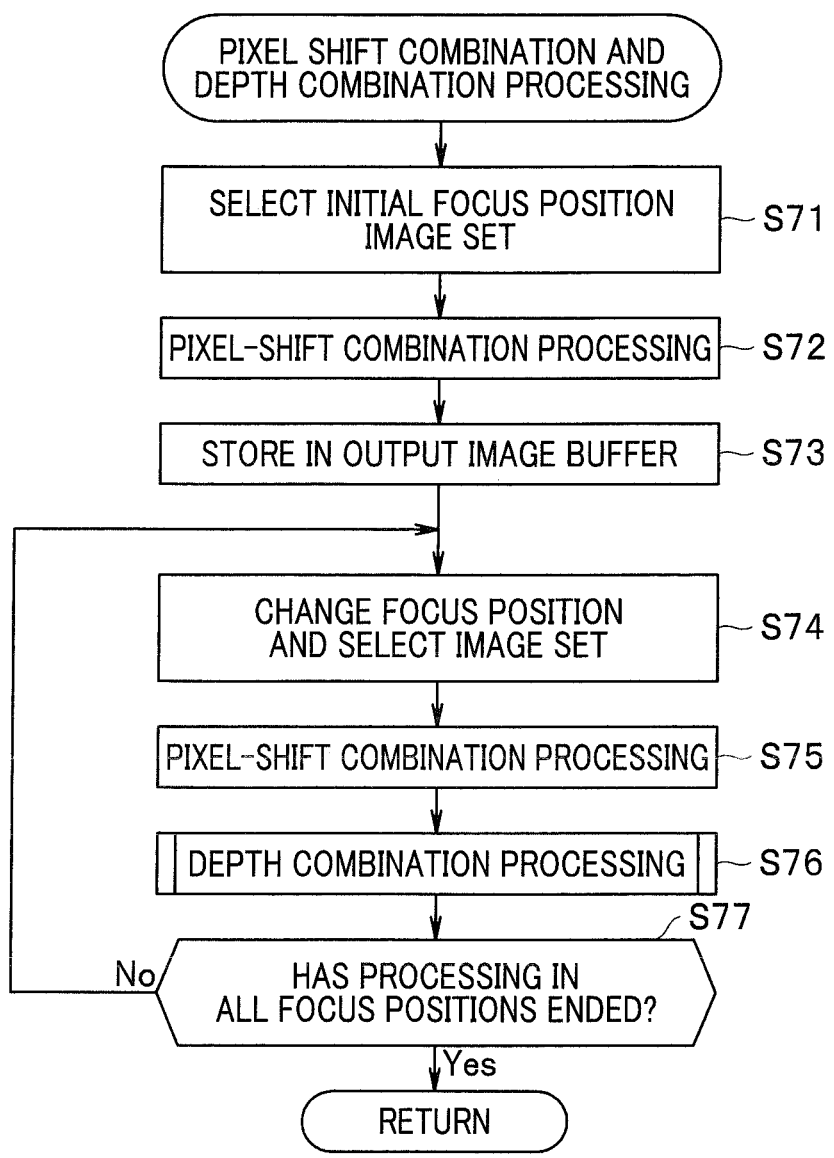
FIG. 23 is a flowchart showing a flow of pixel shift combination and depth combination processing in the digital camera of the third embodiment.

Subsequently, FIG. 23 is a flowchart showing a flow of pixel shift combination and depth combination processing in the digital camera.

When entering the processing in step S25B in FIG. 21, the microcomputer 45 selects an image set including eight entire view angle images acquired by performing pixel shift photographing in the initial focus position (step S71).

Subsequently, the microcomputer 45 performs, with the pixel-shift-combination processing section 30, the pixel-shift combination processing of the eight entire view angle images acquired in the initial focus position and generates one entire view angle pixel-shift combined image (step S72).

The microcomputer 45 stores the generated pixel-shift combined image in the output image buffer in the SDRAM 27 (step S73).

Subsequently, the microcomputer 45 selects an image set including eight images acquired by performing pixel shift photographing in different focus positions (step S74). Among the eight images, one image is an entire view angle image and the other seven images are images of the image pickup region Ap.

Further, the microcomputer 45 performs, with the pixel-shift-combination processing section 30, the pixel-shift combination processing of image portions of the image acquisition region Ac in the eight images and generates one pixel-shift combined image related to the image acquisition region Ac (step S75).

Thereafter, the microcomputer 45 performs, as explained below with reference to FIG. 24, the depth combination processing of the pixel-shift combined image related to the image acquisition region Ac generated in step S75 and the entire view angle pixel-shift combined image stored in the output image buffer (step S76). According to the processing, as explained below with reference to FIG. 24, the image of the output image buffer is updated.

Subsequently, the microcomputer 45 determines whether the processing in all the focus positions has ended (step S77).

When determining that the processing in all the focus positions has not ended, the microcomputer 45 returns to step S74, changes the focus position, and performs the processing explained above.

On the other hand, when determining in step S77 that the processing in all the focus positions has ended, the microcomputer 45 returns from this processing to the processing shown in FIG. 21.

Figure 24:
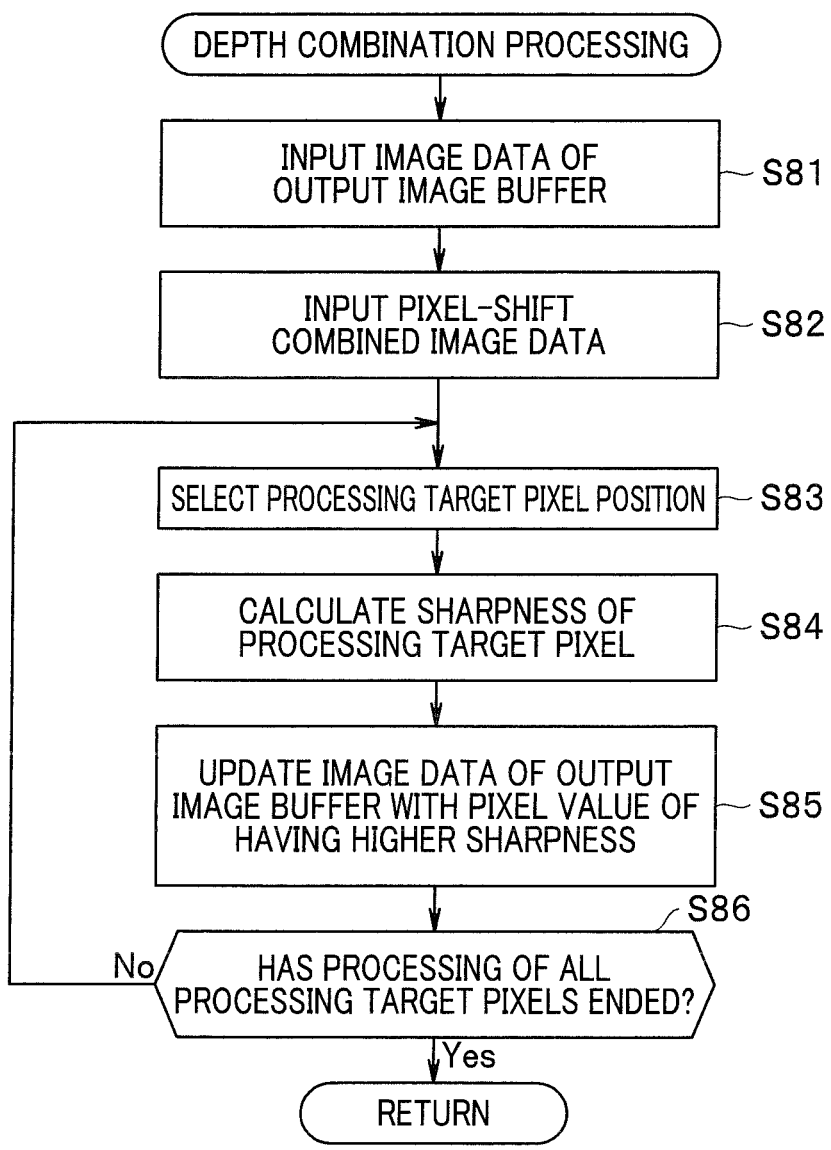
FIG. 24 is a flowchart showing a flow of depth combination processing in the digital camera of the third embodiment.

FIG. 24 is a flowchart showing a flow of the depth combination processing in the digital camera.

When entering the processing in step S76 in FIG. 23, the depth-combination processing section 31 inputs the image data of the output image buffer stored in step S73 in FIG. 23 or image data of the output image buffer updated in step S85 explained below in an immediately preceding loop in a loop of steps S74 to S77 (step S81). The image of the output image buffer is an entire view angle pixel-shift combined image as explained above.

Subsequently, the depth-combination processing section 31 inputs the pixel-shift combined image data of the image acquisition region Ac generated in step S75 in FIG. 23 (step S82).

A target of depth combination in the image inputted in step S81 and the image inputted in step S82 is the image acquisition region Ac. Therefore, the depth-combination processing section 31 selects a processing target pixel position in the image acquisition region Ac (step S83). The selection of the pixel position is performed, for example, in order of raster scan in the image acquisition region Ac according to step S43 explained above.

The depth-combination processing section 31 respectively calculates sharpnesses of processing target pixels in the image inputted in step S81 and the image inputted in step S82 (step S84).

The depth-combination processing section 31 overwrites a pixel value of the processing target pixel having calculated higher sharpness on a pixel value of the processing target pixel position of the output image buffer to update the image data of the output image buffer (step S85).

Thereafter, the depth-combination processing section 31 determines whether the processing concerning all processing target pixels has ended (step S86).

When determining that the processing concerning all the processing target pixels has not ended yet, the depth-combination processing section 31 returns to step S83, selects a next processing target pixel position, and performs the processing explained above.

On the other hand, when determining in step S86 that the processing concerning all the processing target pixel positions has ended, the depth-combination processing section 31 returns from this processing to the processing shown in FIG. 23.

According to the third embodiment explained above, an effect substantially the same as the effect in the first and second embodiments is achieved. Since a focused region of an image acquired in a new focus position is extracted by comparing sharpness of the image with sharpness of an already-acquired image in a focus position. Therefore, it is possible to more accurately extract the focused region.

If the focused region is highly accurately extracted, it is unnecessary to secure the image acquisition region Ac rather large taking into account a margin. Therefore, it is possible to appropriately reduce time required for acquisition and processing of an image and appropriately save a memory capacity. It is also possible to appropriately reduce a load of the pixel-shift combination processing and a load of the depth combination processing.

More specifically, as in the example explained above, it is assumed that the number of images acquired in one focus position for the pixel-shift combination processing is eight and the number of focus positions in the focus bracket photographing is ten. In this case, in the configuration of the first embodiment explained above, the number of entire view angle images to be acquired is twenty. In the configuration of the second embodiment explained above, the number of the entire view angle images to be acquired is ten. On the other hand, in the present embodiment, eight entire view angle images only have to be acquired in a first focus position and one entire view angle image only has to be acquired in the following second to eighth focus positions. Therefore, the number of entire view angle images to be acquired is fifteen.

More generally, when the number of entire view angle images acquired in one focus position is represented as x (x is an integer equal to or lager than 2) and the number of focus positions in the focus bracket photographing is represented as y (y is an integer equal to or larger than 2), the number of entire view angle images acquired in the first embodiment is 2y, the number of entire view angle images acquired in the second embodiment is y, and the number of entire view angle images acquired in the present embodiment is (x+y−1). Therefore, it is seen that the number of entire view angle images acquired in the second embodiment is the smallest. On the other hand, when the number 2y of entire view angle images acquired in the first embodiment and the number (x+y−1) of entire view angle images acquired in the present embodiment are compared, when y>(x−1), it is seen that the number of entire view angle images acquired in the present embodiment is smaller than the number of entire view angle images acquired in the first embodiment explained above. That is, for example, when x=8, if the number y of focus positions in the focus bracket photographing is larger than 7, it is seen that it is possible to further reduce a data amount to be acquired than in the first embodiment.

Fourth Embodiment

Figure 25:
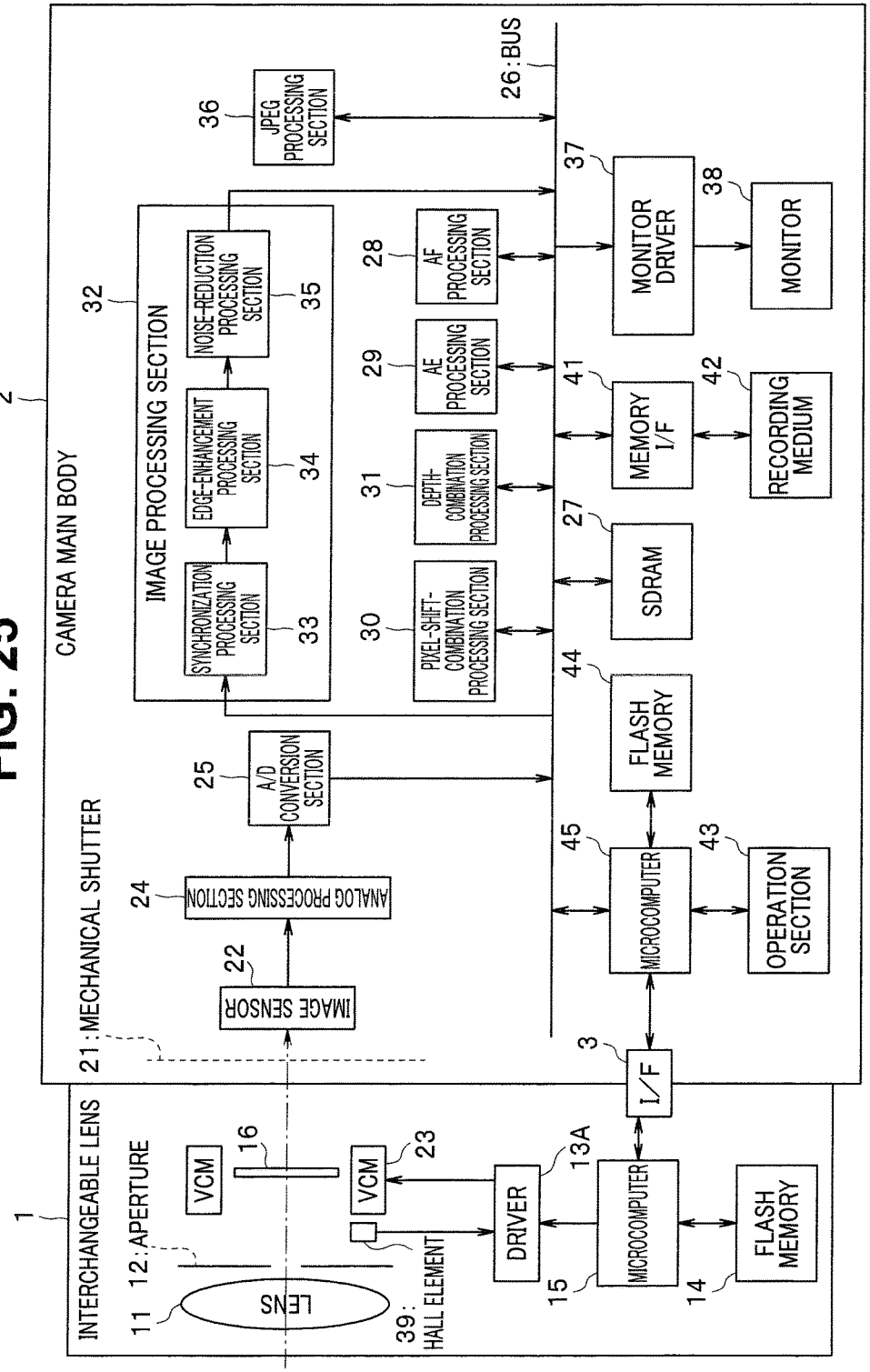
FIG. 25 is a block diagram showing a configuration of a digital camera in a fourth embodiment of the present invention.

FIG. 25 shows a fourth embodiment of the present invention and is a block diagram showing a configuration of a digital camera.

In the fourth embodiment, explanation of portions same as the portions in the first to third embodiments explained above is omitted as appropriate by, for example, attaching the same reference numerals and signs to the portions. Only differences are mainly explained.

In the configuration example shown in FIG. 1 of the first embodiment, the image sensor 22 is moved in the plane perpendicular to the optical axis of the lens 11 by the voice coil motor (VCM) 23 to perform the pixel shift. However, in the present embodiment, an optical-axis-shift optical element 16 is provided in the interchangeable lens 1. The pixel shift is performed by moving the optical-axis-shift optical element 16.

That is, in the interchangeable lens 1, the lens 11, the aperture 12, the flash memory 14, and the microcomputer 15 are provided. Further, the optical-axis-shift optical element 16, the voice coil motor (VCM) 23, and the Hall element 39 are provided. A driver 13A of the present embodiment includes, in addition to the function of the driver 13 explained above, a function of performing driving control of the voice coil motor (VCM) 23 on the basis of a detection result of the Hall element 39.

The optical-axis-shift optical element 16 shifts an optical axis of a light beam traveling from the lens 11 to the image sensor 22. It is possible to widely adopt optical-axis-shift optical elements of various schemes (or may be optical-axis-shift optical elements functioning as a so-called optical blur correction mechanism as well) such as a scheme for tilting an optical plate having a predetermined refractive index and predetermined thickness non-perpendicularly to the optical axis to shift the optical axis and adjusting a tilting angle to control a shift amount and a scheme for moving liquid having a predetermined refractive index in a bellows state across two optical plates (in a state in which an optical plate on an incidence side and an optical plate on an emission side are not parallel) to thereby correct the optical axis.

The voice coil motor (VCM) 23 drives the optical-axis-shift optical element 16 to shift the optical axis on the basis of control by the driver 13A.

Further, the Hall element 39 detects a driving position of the optical-axis-shift optical element 16.

In this way, the driver 13A drives the voice coil motor (VCM) 23 while referring to a detection result of the Hall element 39 and controls a shift direction and a shift amount of the optical axis by the optical-axis-shift optical element 16 on the basis of the control by the microcomputer 15 in the interchangeable lens 1 and on the basis of the control by the microcomputer 45 in the camera main body 2.

Note that the configuration for moving the image sensor 22 to perform the pixel shift explained in the first to third embodiments and the configuration of the fourth embodiment may be combined to form a configuration for moving both of the image sensor 22 and the optical-axis-shift optical element 16 and performing the pixel shift. In this case, the voice coil motor (VCM) 23 configured to move the image sensor 22 and the voice coil motor (VCM) 23 configured to move the optical-axis-shift optical element 16 are provided. Further, the Hall element 39 configured to detect a position of the image sensor 22 and the Hall element 39 configured to detect a position of the optical-axis-shift optical element 16 are provided.

According to the fourth embodiment explained above, even when the optical system is moved to perform the pixel shift or when the image sensor 22 and the optical system are moved to perform the pixel shift, an effect substantially the same as the effect in the first to third embodiments can be achieved.

Note that the respective sections explained above may be configured as circuits. Any circuit may be implemented as a single circuit or may be implemented as a circuit obtained by combining a plurality of circuits as long as the circuit can play the same function. Further, any circuit is not limited to be configured as a dedicated circuit for playing a target function and may be configured to play the target function by causing a general-purpose circuit to execute a processing program.

The image pickup apparatus is mainly explained above. However, the present invention may be an image pickup method for performing processing same as the processing of the image pickup apparatus or may be a processing program for causing a computer to execute the image pickup method, a non-transitory recording medium that can be read by the computer and records the processing program, and the like.

The present invention is not limited to the embodiments per se. In an implementation stage, the constituent elements can be modified and embodied in a range not departing from the spirit of the present invention. Modes of various inventions can be formed by appropriate combinations of the plurality of constituent elements disclosed in the embodiments. For example, several constituent elements may be deleted from all the constituent elements described in the embodiments. Further, the constituent elements described in different embodiments may be combined as appropriate. In this way, naturally, various modifications and applications are possible within the range not departing from the spirit of the invention.

What is claimed is:

1. An image pickup apparatus comprising a processor configured of hardware, the processor being configured to function as:

a pixel-shift processing circuit and actuator configured to perform pixel shift photographing in a certain focus position to acquire a plurality of image data and perform pixel-shift combination processing of the acquired plurality of image data to generate pixel-shift combined image data;

a depth processing circuit configured to cause the pixel-shift processing circuit and actuator to perform processing on a plurality of focus positions, cause the pixel-shift processing circuit and actuator to generate a plurality of pixel-shift combined image data in different focus positions, and perform depth combination processing of the plurality of pixel-shift combined image data to generate an image having large depth of field; and a focused-region extracting circuit configured to calculate sharpness of each pixel in the image and extract a focused region according to the sharpness in at least one of the plurality of focus positions, wherein the pixel-shift processing circuit and actuator performs, concerning a focus position where the focused region is extracted, the pixel-shift combination processing concerning only a partial image region including the focused region.

2. The image pickup apparatus according to claim 1, wherein the pixel-shift processing circuit and actuator includes a pixel-shift-image-pickup control circuit configured to control, concerning the focus position where the focused region is extracted, image data acquired after the focused region is extracted to be image data of only the partial image region including the focused region.

3. The image pickup apparatus according to claim 1, wherein, only when a pixel position common to two or more pixel-shift combined image data is present, the depth processing circuit performs the depth combination processing on a pixel in the pixel position.

4. The image pickup apparatus according to claim 1, wherein the focused-region extracting circuit calculates sharpness of each pixel in an image before pixel shift image combination and extracts, as the focused region, a region of a pixel, the sharpness of which is equal to or larger than a predetermined value.

5. The image pickup apparatus according to claim 1, wherein
the processor further functions as an image-pickup control circuit configured to control the image pickup apparatus to photograph two images at different aperture opening diameters, and
the focused-region extracting circuit calculates sharpness of each pixel in the two images at the different aperture opening diameters and extracts, as the focused region, a region of a pixel having higher sharpness in a same pixel position in an image photographed at a larger aperture opening diameter.

6. The image pickup apparatus according to claim 1, wherein the focused-region extracting circuit sets, when the focus position is a first focus position, an image before pixel shift combination obtained by photographing as a combined image for detection, performs, when the focus position is a second or subsequent focus position, depth combination of a combined image for detection already set and an image before the pixel shift combination obtained by performing photographing in a present focus position and updates the combined image for detection, calculates, when the focus position is changed, sharpnesses of each pixel of an image before the pixel shift combination obtained by performing photographing in a new focus position and the combined image for detection, and extracts, as the focused region, a region of a pixel having higher sharpness in a same pixel position in an image before the pixel shift combination obtained by performing photographing in the new focus position.

7. The image pickup apparatus according to claim 1, further comprising:
an image sensor in which a plurality of pixels are two-dimensionally arrayed at a predetermined pixel pitch; and
an image-pickup optical system configured to form an optical image of an object on the image sensor and capable of moving a focus position, wherein
the pixel-shift processing circuit and actuator includes:
a pixel shifting actuator configured to perform a pixel shift such that relative positions in the two-dimensional array direction of the image sensor and a light beam received by the image sensor are moved by a movement amount that is a non-integer multiple of the pixel pitch;
a pixel-shift-image-pickup control circuit configured to perform pixel shift image pickup control for causing the pixel shifting actuator to perform the pixel shift and causing the image sensor to perform a photographing operation and acquire an image set including a plurality of image data in the different relative positions; and
a pixel-shift-combination processing circuit configured to combine, in each of the focus positions, a plurality of image data included in the image set acquired by the pixel-shift-image-pickup control circuit and generate pixel-shift combined image data having resolution higher than resolution of image data obtained from the image sensor, and
the depth processing circuit includes:
a focus-bracket-image-pickup control circuit configured to discretely move the focus position of the image-pickup optical system to a plurality of positions, cause the pixel-shift-image-pickup control circuit to perform the pixel shift image pickup control in each of the focus positions, and acquire a plurality of sets of the image set in different focus positions; and
a depth-combination processing circuit configured to calculate sharpness of each pixel of a plurality of pixel-shift combined image data in different focus positions generated by the pixel-shift-combination processing circuit and compose an image having a larger depth of field than the image data obtained from the image sensor by performing depth combination processing for setting pixel values of pixels having highest sharpness in each of pixel positions as pixel values of the pixel positions.

8. An image pickup method comprising:
performing pixel shift photographing in a certain focus position to acquire a plurality of image data and performing pixel-shift combination processing of the acquired plurality of image data to generate pixel-shift combined image data;
executing, on a plurality of focus positions, processing for generating the pixel-shift combined image data to generate a plurality of pixel-shift combined image data in different focus positions and performing depth combination processing of the plurality of pixel-shift combined image data to generate an image having large depth of field; and calculating sharpness of each pixel in the image and extracting a focused region according to the sharpness in at least one of the plurality of focus positions, wherein in the processing for generating the pixel-shift combined image data, concerning a focus position where the focused region is extracted, the pixel-shift combination processing is performed concerning only a partial image region including the focused region.

9. In a non-transitory computer-readable medium storing a computer program, the computer program causing a computer to execute:

performing pixel shift photographing in a certain focus position to acquire a plurality of image data and performing pixel-shift combination processing of the acquired plurality of image data to generate pixel-shift combined image data;

executing, on a plurality of focus positions, processing for generating the pixel-shift combined image data to generate a plurality of pixel-shift combined image data in different focus positions and performing depth combination processing of the plurality of pixel-shift combined image data to generate an image having large depth of field; and calculating sharpness of each pixel in the image and extracting a focused region according to the sharpness in at least one of the plurality of focus positions, wherein in the processing for generating the pixel-shift combined image data, concerning a focus position where the focused region is extracted, the pixel-shift combination processing is performed concerning only a partial image region including the focused region.

* * * * *